US009710457B2

United States Patent
Stobbs et al.

(10) Patent No.: US 9,710,457 B2
(45) Date of Patent: *Jul. 18, 2017

(54) COMPUTER-IMPLEMENTED PATENT PORTFOLIO ANALYSIS METHOD AND APPARATUS

(76) Inventors: Gregory A. Stobbs, Bloomfield Hills, MI (US); John V. Biernacki, Columbia Station, OH (US)

(*) Notice: Subject to any disclaimer, the term of this patent is extended or adjusted under 35 U.S.C. 154(b) by 939 days.

This patent is subject to a terminal disclaimer.

(21) Appl. No.: 13/346,280

(22) Filed: Jan. 9, 2012

(65) Prior Publication Data

US 2012/0109642 A1     May 3, 2012

Related U.S. Application Data

(60) Continuation of application No. 10/806,307, filed on Mar. 22, 2004, now Pat. No. 8,095,581, which is a division of application No. 09/499,238, filed on Feb. 7, 2000, now abandoned.

(60) Provisional application No. 60/119,210, filed on Feb. 5, 1999.

(51) Int. Cl.
| | |
|---|---|
| *G06F 17/30* | (2006.01) |
| *G06F 17/27* | (2006.01) |
| *G06Q 10/10* | (2012.01) |
| *G06Q 40/06* | (2012.01) |
| *G06Q 50/18* | (2012.01) |

(52) U.S. Cl.
CPC ........ *G06F 17/2785* (2013.01); *G06Q 10/10* (2013.01); *G06Q 40/06* (2013.01); *G06Q 50/184* (2013.01)

(58) Field of Classification Search
CPC .. G06F 17/2785; G06Q 50/184; G06Q 40/06; G06Q 10/10

USPC .......... 707/934, 923, 930, 931, 933
See application file for complete search history.

(56) References Cited

U.S. PATENT DOCUMENTS

| | | | |
|---|---|---|---|
| 5,526,443 A | 6/1996 | Nakayama | |
| 5,608,620 A | 3/1997 | Lundren | |
| 5,623,679 A | 4/1997 | Rivette et al. | |
| 5,710,833 A * | 1/1998 | Moghaddam et al. | 382/228 |

(Continued)

FOREIGN PATENT DOCUMENTS

WO       WO 00/75851       12/2000

OTHER PUBLICATIONS

Dealing with occlusions in the eigenspace approach, Ales Leonardis et al., 1996.*

(Continued)

*Primary Examiner* — Jean M Corrielus
(74) *Attorney, Agent, or Firm* — Harness, Dickey & Pierce, P.L.C.

(57) ABSTRACT

A computer-implemented apparatus and method for performing patent portfolio analysis. The patent portfolio analysis apparatus and method clusters a group of patents based upon one or more techniques. The clustering techniques include linguistic clustering techniques (e.g., eigenvector analysis), claim meaning, and patent classification techniques. Different aspects of the clusters are analyzed, including financial, claim breadth, and assignee patent comparisons. Moreover, patents and/or their clusters are linked to the Internet in order to determine what products might be covered by the claims of the patents or whether materials on the Internet might render patent claims invalid.

7 Claims, 29 Drawing Sheets

(56) References Cited

U.S. PATENT DOCUMENTS

| | | | |
|---|---|---|---|
| 5,737,727 A * | 4/1998 | Lehmann | G06Q 10/06 705/7.13 |
| 5,754,840 A | 5/1998 | Rivette et al. | |
| 5,774,833 A | 6/1998 | Newman | |
| 5,778,400 A | 7/1998 | Tateno | |
| 5,788,504 A * | 8/1998 | Rice | G09B 19/0069 434/219 |
| 5,991,751 A * | 11/1999 | Rivette et al. | |
| 5,999,907 A | 12/1999 | Donner | |
| 6,014,663 A | 1/2000 | Rivette et al. | |
| 6,018,714 A | 1/2000 | Risen et al. | |
| 6,038,561 A * | 3/2000 | Snyder | G06F 17/30011 |
| 6,049,811 A | 4/2000 | Petruzzi et al. | |
| 6,175,824 B1 | 1/2001 | Breitzman et al. | |
| 6,192,360 B1 * | 2/2001 | Dumais | G06F 17/30707 |
| 6,233,575 B1 * | 5/2001 | Agrawal | G06F 17/3071 |
| 6,339,767 B1 * | 1/2002 | Rivette et al. | 707/781 |
| 6,343,267 B1 * | 1/2002 | Kuhn et al. | 704/222 |
| 6,389,436 B1 | 5/2002 | Chakrabarti et al. | |
| 6,446,061 B1 * | 9/2002 | Doerre | G06F 17/3071 707/738 |
| 6,499,026 B1 * | 12/2002 | Rivette et al. | |
| 6,556,992 B1 | 4/2003 | Barney et al. | |
| 6,574,645 B2 | 6/2003 | Petruzzi et al. | |
| 6,665,656 B1 | 12/2003 | Carter | |
| 6,697,778 B1 * | 2/2004 | Kuhn et al. | 704/243 |
| 6,704,743 B1 | 3/2004 | Martin | |
| 6,879,990 B1 | 4/2005 | Boyer et al. | |
| 6,970,820 B2 * | 11/2005 | Junqua et al. | 704/258 |
| 7,523,126 B2 | 4/2009 | Rivette et al. | |
| 7,899,225 B2 * | 3/2011 | Collins et al. | 382/128 |
| 7,949,728 B2 * | 5/2011 | Rivette et al. | 709/219 |
| 8,095,581 B2 * | 1/2012 | Stobbs et al. | 707/934 |
| 2001/0037324 A1 * | 11/2001 | Agrawal | G06F 17/3071 |
| 2002/0002450 A1 * | 1/2002 | Nunberg | G06F 17/271 704/1 |
| 2002/0046038 A1 | 4/2002 | Prokoski | |
| 2002/0082778 A1 | 6/2002 | Barnett et al. | |
| 2003/0004936 A1 | 1/2003 | Grune et al. | |
| 2004/0220842 A1 | 11/2004 | Barney | |
| 2007/0276796 A1 * | 11/2007 | Sampson | 707/2 |

OTHER PUBLICATIONS

Face recognition using view-based and modular eigenspcaes, Moghaddam et al.,, 1994.*

An eigenspace update algorithm for image analysis, Chandrasekaran et al., 1997.*

Classification of coins using and eigenspace approach, Penz et al., 2004.*

Dimensionality Reduction, A Short Tutorial, Ali Ghodsi, 2006.*

U.S. Appl. No. 60/137,495, filed Jun. 4, 1999, Goffman et al.

U.S. Appl. No. 60/142,961, filed Jul. 12, 1999, Goffman et al.

U.S. Appl. No. 60/190,085, filed Mar. 20, 2000, Goffman et al.

Galbi, "Software and Patents: A Status Report", Apr. 1971, ACM, vol. 14, No. 4, pp. 274-280.

Osborn, et al., "Evaluating Document Retrieval in Patent Database: A Preliminary Report", 1997, pp. 216-221.

"Proprietary Valuation Techniques", www.consor.com/valuation/techniques.htm, 3 pages.

McCallum, et al., "Text Classification by Bootstrapping with Keywords, EM and Shrinkage", 1999, Workshop on Unsupervised Learning in Natural Language Processing, pp. 52-58.

Iwayama, et al., "Overview of Patent Retrieval Task at NTCIR-3", Proceedings of the ACL-2003 Workshop on Patent Corpus Processing, pp. 24-32.

Patel, "A Patent Portfolio Development Strategy for Start-Up Companies", Fenwick & West, LLP, pp. 1-4.

"Patent Portfolio Analysis", http:/www.teklicon.com/patent.shtml, 2004, 4 pages.

Lin, et al. "Patent Portfolio Diversity, Technology Strategy, and Firm Value", IEEE Transactions on Engineering Management, vol. 53, No. 1, Feb. 2006, pp. 17-26.

* cited by examiner

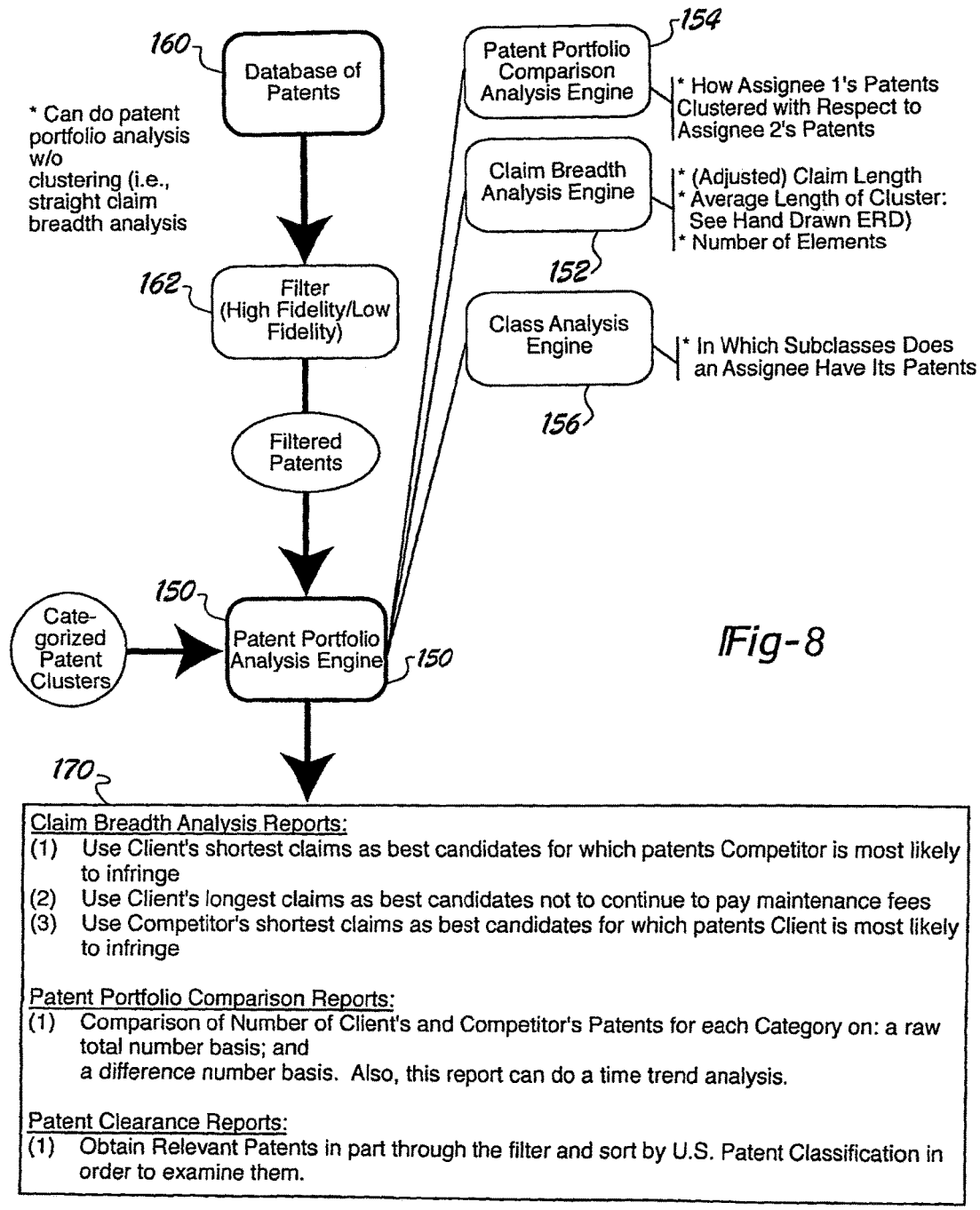

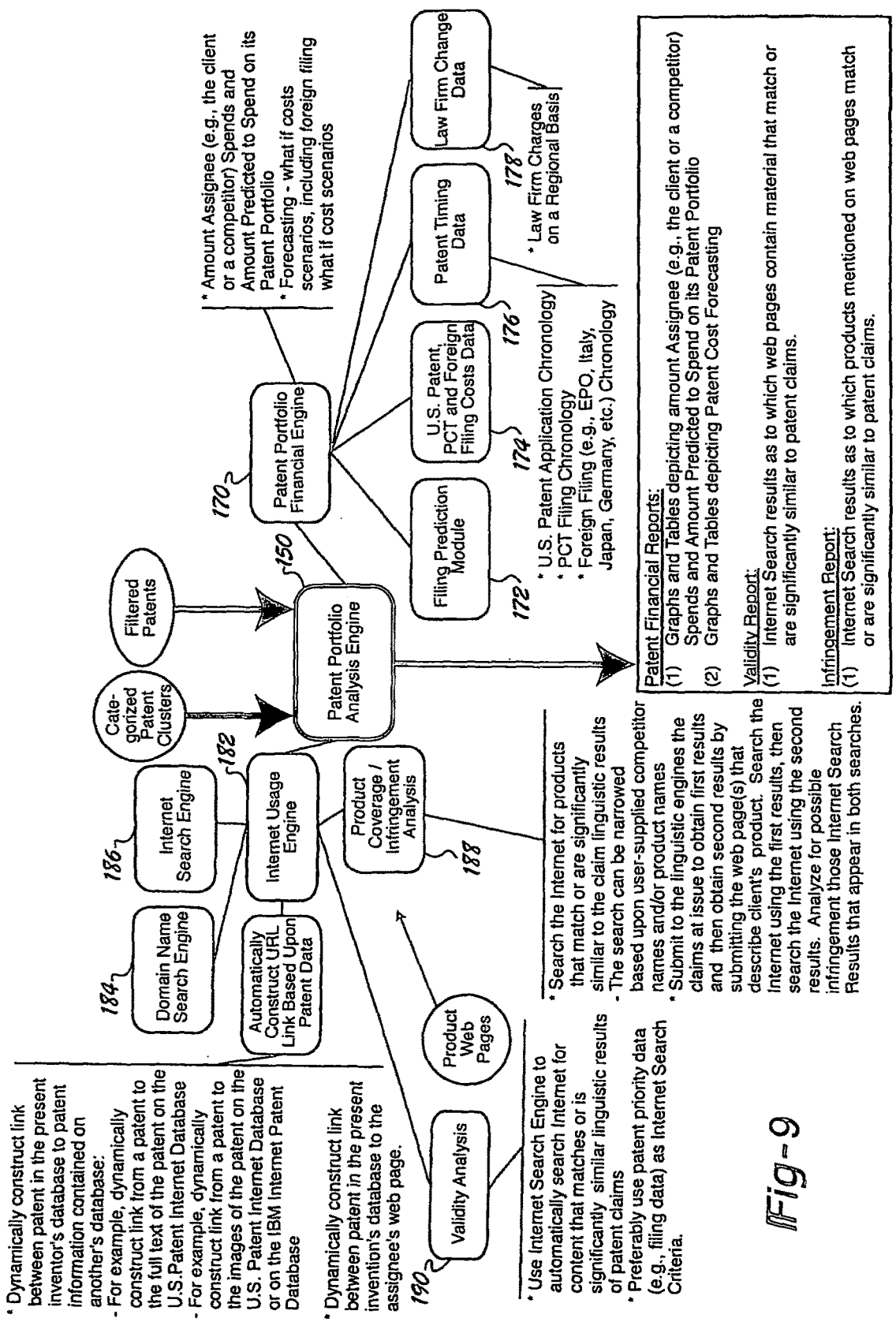

| Category Number | Category | Assignee | Count of Assigneee | Sum of Factor | Avg. of Cluster Score | Claim Cluster Num |
|---|---|---|---|---|---|---|
| A.1 | Fuzzy Logic | Assignee B | 8 | 7.25 | 31.00 | 1 |
| A.1 | Fuzzy Logic | Assignee B | 2 | 2 | 56.00 | 45 |
| A.1 | Fuzzy Logic | Assignee B | 6 | 4.75 | 31.17 | 58 |
| A.1 | Fuzzy Logic | Assignee B | 3 | 2.75 | 35.67 | 59 |
| A.1 | Fuzzy Logic | Assignee B | 1 | 1 | 46.00 | 77 |
| A.1 | Fuzzy Logic | Assignee B | 3 | 2.75 | 31.67 | 109 |
| A.1 | Fuzzy Logic | Assignee B | 1 | 0.75 | 22.00 | 128 |
| A.1 | Fuzzy Logic | Assignee B | 2 | 1.25 | 19.50 | 132 |
| A.1 | Fuzzy Logic | Assignee B | 2 | 1.5 | 29.00 | 138 |
| A.1 | Fuzzy Logic | Assignee B | 3 | 2.5 | 32.67 | 139 |
| A.1 | Fuzzy Logic | Assignee A | 1 | 0.5 | 15.00 | 1 |
| A.1 | Fuzzy Logic | Assignee A | 3 | 2.25 | 23.67 | 37 |
| A.1 | Fuzzy Logic | Assignee A | 1 | 1 | 34.00 | 58 |
| A.1 | Fuzzy Logic | Assignee A | 1 | 0.75 | 25.00 | 59 |
| A.1 | Fuzzy Logic | Assignee A | 3 | 2.75 | 48.00 | 77 |
| A.1 | Fuzzy Logic | Assignee A | 3 | 3 | 36.67 | 103 |
| A.1 | Fuzzy Logic | Assignee A | 6 | 5 | 28.67 | 128 |
| A.1 | Fuzzy Logic | Assignee A | 2 | 1.75 | 28.50 | 132 |
| A.1 | Fuzzy Logic | Assignee A | 2 | 1.75 | 35.50 | 138 |

[ Run Search ] [ Look At This Pat. ] [ Save Results In Excel (or in another format) ] [ Close Form ]

1-E Commerce
  1.1-E commerce Pr
  2-POS Terminal · Patents having POS or electronic cash register
    For Cost/Price

| Claim Breadth | Assignee | Pat. No. | Patent Title | | |
|---|---|---|---|---|---|
| 21 | Datavision Technologies Corporation (formerly Excnet) | 5,099,422 | Compilling system and method of producing individually customized recording media | 17. A method for d Cost/Price informatin onto blank storage media devices, comprising: storing said retrieved segments onto individual ones of the storage media devices. | *Filing Date:* 03/17/1989  *Issue Date:* 03/24/1992 |
| 34 | Financial Services Technology Consortium | 5,677,955 | Electronic funds transfer instruments | 44. A computer-based method of attaching a document to a related electronic payment instrument comprising, forming a cryptographic hash of the document, and appending the hash to the electronic payment instrument. | *Filing Date:* 04/07/1995  *Issue Date:* 10/14/1997 |
| 35 | American Telephone and Telegraph Company | 4,744,028 | Methods and apparatus for efficient resource allocation | 16. The improvement in linear programming methods for optimally allocating physical resources among a plurality of users which includes the steps of: iterating on only strictly feasible allocations, and normalizing each strictly feasible allocation with respect to the constraints on said allocations. | *Filing Date:* 04/19/1985  *Issue Date:* 05/10/1988 |
| 36 | | 5,233,513 | Business modeling, software engineering and prototyping method and apparatus | 11. A method for creating a business management system, including the steps of: creating business models with a general knowledge modeling system incorporating a four Dimensional Cognitive Modeling Expert system; | *Filing Date:* 12/28/1989 |

*Fig-11*

| Claim Breadth | Assignee | Pat. No. | Patent Title | Claim Text | Category |
|---|---|---|---|---|---|
| 21 | Datavision Technologies Corporation (formerly Excnet) | 5,099,422 | Compiling system and method of producing individually customized recording media | 17. A method for c informatin onto blank storage media devices, comprising: storing said retrieved segments onto individual ones of the storage media devices. | 1-E Commerc  Filing Date: 3/17/89  Issue Date: 3/24/92 |
| 40 | Sterling Commerce | 5,794,206 | Method and system for displaying electronic data interchanges in a computer | 31. A method for displaying EDI messages in a computer, comprising the steps of: displaying an interchange window including at least one interchange entry associated with an interchange of an EDI message; and displaying a status icon representing the status of the interchange. | 1-E Commerc  Filing Date: 5/6/96  Issue Date: 8/11/98 |
| 42 | Sterling Commerce | 5,794,206 | Method and system for displaying electronic data interchanges in a computer | 46. A method for displaying EDI messages in a computer, comprising the steps of: displaying an interchange window including at least one interchange entry associated with an interchange of an EDI message; and displaying a functional group entry associated a functional group of the interchange. | 1-E Commerc  Filing Date: 5/6/96  Issue Date: 8/11/98 |
| 44 | Sterling Commerce | 5,794,206 | Method and system for displaying electronic data interchanges in a | 30. A window in a graphical user interface, comprising: an interchange window operable to display at least one interchange entry associated with an | 1-E Commerc  Filing Date: |

Claims to be Reviewed

| Rank | Patent Number | Filing Date | Issue Date |
|---|---|---|---|
| 5 | 5,099,422 | 03/17/1989 | 03/24/1992 |

| Assignee |
|---|
| Datavision Technologies Corporation (formerly Excnet |

| Claim Text |
|---|
| 17. A method for compiling individually customized information onto blank storage media devices, comprising: storing said retrieved segments onto individual ones of the storage media devices. |

| Abstract |
|---|
| The compiling system and method of the present invention enables the recording of individually customized information onto blank storage media devices, and includes a data base memory device for storing information signals indicative of customized recipient information pertaining to a group of recipients. A presentation memory device stores a group of pre-recorded signals indicative of a group of infomation segments to be compiled selectively. A computing device responds to stored information signals indicative of customized recipient information for selecting certain ones of said pre-recorded signals indicative of certain ones of said segments and for causing signals indicative of certain ones of said segments to be retrieved selectively in a given sequence for compilation purposes. A recording device responds to retrieved signals indicative of certain ones of said segments for storing said retrieved signals onto individual ones of the storage media devices. |

| Claim Comments |
|---|
| <<user can insert comments>> |

| Rank | Patent Number | Filing Date | Issue Date |
|---|---|---|---|
| 3 | 5,677,955 | 04/07/1995 | 10/14/1997 |

| Assignee | |
|---|---|
| Financial Services Technology Consortium | This clause visually presented differently (e.g. highlighted). |

| Claim Text |
|---|
| 1. A computer-based method comprising creating an electronic instrument for effecting a transfer of funds from an account of a payer in a funds-holding institution to a payee, the instrument including an electronic signature of the payer, and appending, to the electronic instrument, digital representations of a verifiable certificate by the institution of the authenticity of the account or the account holder. |

| Abstract |
|---|
| An electronic instrument is created in a computer-based method for effecting a transfer of funds from an account of a payer in a funds-holding institution to a payee. The electronic instrument includes an electronic signature of the payer, digital representations of payment instructions, the identity of the payer, the identit of the payee, and the identity of the funds-holding institution. A digital representation of a verifiable certificate by the institution of the authenticity of the instrument is appended to the instrument. This enables a party receiving the instrument, e.g., the payee or a bank, to verify the authenticity of the account or account holder. The invention may be generally applied to any financial electronic document. |

| Claim Comments |
|---|

| Run Search | Look At This Pat. | Save Results In Excel (or in another format) | Close Form |
|---|---|---|---|

Claim Breadth: *hitachi* — 462

| | Assignee | Pat. No. | Patent Title | Claim Text | Category |
|---|---|---|---|---|---|
| 1210 | Hitachi | 5,586,022 | Method of evaluating easiness of works and processings performed on articles and evaluation apparatus | 10. A method of operating a computer for evaluating whether an article has a structure which facilitates work to be performed thereon, comprising: registered data, in said computer and processing to data to evaluate easiness of work to be performed on an article under evaluation, said registering data in said computer includes the steps of: | Filing Date: 12/17/1996  Issue Date: 05/25/1999 |
| 862 | Hitachi | 5,907,488 | Method of evaluating easiness of works and processings performed on articles and evaluation apparatus | 1. A method of evaluating quantitatively whether an article has a structure which facilitates work to be performed thereon with the aid of a computer, comprising: processing for registration in said computer and processing for evaluating easiness of work to be performed on an article under evaluation, wherein said processor for registration in said computer | Filing Date: 09/19/1996  Issue Date: 05/25/1999 |
| 851 | Hitachi | 5,586,022 | Method of evaluating easiness of works and processings performed on articles and evaluation apparatus | 2. A method of operating a computer for quantitatively evaluating whether an article has a structure which facilitates work to be performed thereon, comprising: registering data in said computer and processing the data to evaluate easiness of work to be performed on an article under evaluation, said registering data in said computer includes | Filing Date: 08/15/1994  Issue Date: 12/17/1996 |
| 759 | Hitachi | 5,576,965 | Method and apparatus for aiding of designing process | 14. An apparatus for aiding a process for producing a design solution, wherein, on the basis of design knowledge including an attribute model representing a design specification of a product expressed by a group of a plurality of attributes and | Filing Date: 04/12/1993 |

| Run Search | Save Results In Excel (or in another format) | | Close Form | |
|---|---|---|---|---|
| *sharp*¹ | | ▽ | | |

*472*

↳ *470*

| Year Filed | Assignee | Category | # Filed |
|---|---|---|---|
| 1980 | Sharp Kabushiki Kaisha | S | 1 |
| 1983 | Casio Computer Co | POS Terminal | 1 |
| 1983 | Casio Computer Co. | S | 1 |
| 1985 | | A | 1 |
| 1989 | The United States of America as represented k | A | 1 |
| 1990 | | A | 1 |
| 1990 | Heads Up Technologies | A | 1 |
| 1990 | Interactive Voice Data Systems Inc. | A | 1 |
| 1992 | EC Corporation | A | 1 |
| 1993 | Macrovision Corporation | A | 1 |
| 1994 | | A | 1 |

*Fig-18*

| Run Search | Save Results In Excel (or in another format) | | | Close Form | |
|---|---|---|---|---|---|
| *sharp* | | | | | |

472

| Year Filed | Assignee | Category | # Filed |
|---|---|---|---|
| 1983 | Sharp Kabushiki Kaisha | A | 5 |
| 1983 | Sharp Kabushiki Kaisha | 2-POS Terminal | 4 |
| 1981 | Sharp Kabushiki Kaisha | 2-POS Terminal | 3 |
| 1982 | Sharp Kabushiki Kaisha | 2-POS Terminal | 3 |
| 1979 | Sharp Kabushiki Kaisha | A | 2 |
| 1980 | Sharp Kabushiki Kaisha | 2-POS Terminal | 2 |
| 1980 | Sharp Kabushiki Kaisha | A | 2 |
| 1984 | Sharp Kabushiki Kaisha | 2-POS Terminal | 2 |
| 1990 | Sharp Kabushiki Kaisha | 2-POS Terminal | 2 |
| 1982 | Sharp Kabushiki Kaisha | Cost/Price | 1 |
| 1993 | Sharp Kabushiki Kaisha | 2-POS Terminal | 1 |
| 1990 | Sharp Kabushiki Kaisha | A | 1 |
| 1980 | Sharp Kabushiki Kaisha | 2-POS Terminal | 1 |

Fig-19

| Class | Level/Category | Classification Descrip | Notes | Assignee | # of Pats. |
|---|---|---|---|---|---|
| 705/0 | 0 | DATA PROCESSING: FINANCIAL, BUSINESS PRACTICE, MANAGEMENT, OR | This is the generic class for apparatus and corresponding methods for performing data processing operations, in which there is a | | |
| 705/1 | 1 | AUTOMATED ELECTRICAL FINANCIAL OR BUSINESS PRACTICE OR MANAGEMENT | Subject matter under the class definition wherein an electrical apparatus and its corresponding methods perform the data processing | | |
| 705/2 | 2 | . Health care management (e.g., record management, ICDA billing) | Subject matter under subclass 1 drawn to a computer implemented system or method particularly adapted for a health care management or | | |
| 705/3 | 3 | .. Patient record management | Subject matter under subclass 2 wherein the system processes the records of diagnosis or treatment of a patient. | | |
| 705/4 | 3 | .. Insurance (e.g., computer implemented system or method for writing insurance policy, | Subject matter under subclass 1 drawn to a computer implemented system or method for writing an insurance policy or processing an | | |
| 705/5 | 2 | . Reservation, check-in, or booking display for reserved space | Subject matter under subclass 1 drawn to a computerized | | |
| 705/6 | 4 | ... Coordination of p[lural reservations (e.g. plural trip segments; transporation and | Subject matter under subclass 5 wherein the processing system coordinates multiple distinct reservations for a single itinerary. | | |

*Fig-21*

| Class | Level/ Category | Classification Descrip | Notes | Assignee | # of Pats. |
|---|---|---|---|---|---|
| 705/8 | 3 | ... Allocating resources or scheduling for an administrative function | Subject matter under subclass 7 for the distribution of resources or for scheduling in a business or commercial environment. | Microsoft | |
| 705/9 | 4 | .... Staff scheduling or task assignment | Subject matter under subclass 8 for scheduling of or assigning a tasks to an individual or group | Microsoft | |
| 705/14 | 2 | . Distribution or redemption of coupon, or incentive or promotion program | Subject matter under subclass 1 particularly designed for price reduction of, or premium credit resulting from, the purchase of a | Microsoft | |
| 705/17 | 3 <br> 2-POS Term | .. Having interface for record bearing medium or carrier for electronic funds transfer or | Subject matter under subclass 16 further including an arrangement for reading a customer associated payment effecting data bearing record | Microsoft | |
| 705/26 | 2 <br> 1-E Commerc | . Electronic shopping (e.g., remote ordering) | Subject matter under subclass 1 drawn to a computerized arrangement which enables a purchaser to inspect or select from a plurality of different | Microsoft | |
| 705/27 | 3 <br> 1-E Commerc | .. Presentation of image or description of sales item (e.g., electronic catalog browsing) | Subject matter under subclass 26 which includes a feature enabling a user to inspect a listing, or other visual or audible representation of plural | Microsoft | |
| 705/30 | 2 | . Accounting | Subject matter under subclass 1 drawn to a computerized arrangement for recording, analyzing, verifying, or reporting of funds or other | Microsoft | |

Fig-22

| YEAR | US<br># U.S. Filed | US<br># U.S. Issued | 48<br>U.S. Services | Top<br>U.S. Costs | U.S. Total |
|---|---|---|---|---|---|
| 1980 | 1 | 0 | $5,000 | $1,000 | $6,000 |
| 1981 | 2 | 0 | $13,000 | $2,000 | $15,000 |
| 1982 | 2 | 1 | $16,300 | $3,320 | $19,620 |
| 1983 | 2 | 1 | $16,300 | $3,320 | $19,620 |
| 1984 | 3 | 4 | $22,200 | $8,280 | $30,480 |
| 1985 | 4 | 0 | $29,200 | $5,050 | $34,250 |
| 1986 | 1 | 4 | $18,400 | $7,330 | $25,730 |
| 1987 | 1 | 4 | $10,000 | $10,480 | $20,480 |
| 1988 | 2 | 1 | $13,500 | $5,420 | $18,920 |
| 1989 | 0 | 2 | $57,600 | $18,940 | $76,540 |
| 1990 | 3 | 5 | $48,100 | $22,200 | $70,300 |
| 1991 | 13 | 6 | $76,000 | $21,970 | $97,970 |
| 1992 | 13 | 5 | $106,900 | $33,260 | $140,160 |
| 1993 | 10 | 7 | $93,100 | $36,050 | $129,150 |
| 1994 | 26 | 12 | $165,800 | $62,880 | $228,680 |
| 1995 | 12 | 21 | $145,700 | $49,170 | $194,870 |
| 1996 | 9 | 18 | $89,600 | $63,250 | $152,850 |
| 1997 | 10 | 3 | $82,300 | $51,800 | $134,100 |
| 1998 | 17 | 9 | $123,100 | $64,590 | $187,690 |
| 1999 | 13 | 35 | $131,900 | $99,120 | $231,020 |
| 2000 | 13 | 12 | $111,600 | $72,990 | $184,590 |
| 2001 | 13 | 12 | $114,800 | $101,350 | $216,150 |
| 2002 | 13 | 12 | $119,200 | $119,190 | $238,390 |
| 2003 | 13 | 12 | $112,000 | $69,860 | $181,860 |
| 2004 | 13 | 12 | $114,200 | $98,260 | $212,460 |
| 2005 | 13 | 12 | $121,200 | $181,300 | $302,500 |
| | | | | | |
| | | | | | |
| | | | | | |
| Avg from '93-'97 | 13 | 12 | | | |
| # Pats.--> | 232 | 210 | | | |

Fig-23

|  | Germany | Germany | Top 582 14 | 584 | | |
|---|---|---|---|---|---|---|
| YEAR | # Germany Filed | # Germany Issued | Germany Services | Germany Foreign Agents | Germany Costs | Germany Total |
| 1980 | 0 | 0 | $0 | $0 | $0 | $0 |
| 1981 | 0 | 0 | $0 | $0 | $0 | $0 |
| 1982 | 1 | 0 | $700 | $2,468 | $332 | $3,500 |
| 1983 | 1 | 0 | $2,300 | $5,068 | $332 | $7,700 |
| 1984 | 1 | 0 | $2,300 | $5,068 | $332 | $7,700 |
| 1985 | 1 | 0 | $2,300 | $5,068 | $332 | $7,700 |
| 1986 | 4 | 1 | $4,600 | $12,790 | $1,639 | $19,029 |
| 1987 | 3 | 1 | $8,800 | $18,122 | $1,522 | $28,444 |
| 1988 | 4 | 2 | $8,200 | $18,308 | $2,411 | $28,919 |
| 1989 | 5 | 3 | $10,900 | $23,694 | $3,572 | $38,166 |
| 1990 | 3 | 4 | $11,600 | $21,676 | $4,029 | $37,305 |
| 1991 | 8 | 8 | $13,100 | $30,088 | $8,106 | $51,294 |
| 1992 | 4 | 5 | $18,500 | $32,262 | $8,085 | $58,847 |
| 1993 | 7 | 5 | $14,700 | $29,266 | $11,024 | $54,990 |
| 1994 | 42 | 5 | $44,500 | $123,446 | $25,022 | $192,968 |
| 1995 | 28 | 8 | $91,800 | $180,848 | $24,074 | $296,722 |
| 1996 | 30 | 6 | $71,200 | $148,7480 | $28,037 | $247,985 |
| 1997 | 27 | 10 | $73,700 | $147,816 | $32,497 | $254,013 |
| 1998 | 5 | 1 | $52,7000 | $82,858 | $28,237 | $163,795 |
| 1999 | 27 | 15 | $35,800 | $84,406 | $44,920 | $165,126 |
| 2000 | 27 | 15 | $72,500 | $141,606 | $54,025 | $268,131 |
| 2001 | 27 | 15 | $74,000 | $141,606 | $64,094 | $279,700 |
| 2002 | 27 | 15 | $75,500 | $141,606 | $75,704 | $292,810 |
| 2003 | 27 | 15 | $77,000 | $141,606 | $88,951 | $307,557 |
| 2004 | 27 | 15 | $78,400 | $141,606 | $101,415 | $321,421 |
| 2005 | 27 | 15 | $79,800 | $141,606 | $115,656 | $337,062 |
|  |  |  |  |  |  |  |
|  |  |  |  |  |  |  |
| Avg from '93-'97 | 27 | 7 | 59180 | 126025 | 24131 | 209336 |
| # Pats.--> | 363 | 164 |  |  |  |  |

Fig-24

| Time (year) | U.S. Events | U.S. Services *620* | U.S. Costs | U.S. Events *622* | U.S. Services | U.S. Costs *626* |
|---|---|---|---|---|---|---|
| 0-1 | *Filling of U.S. Patent App.:* Atty Pat. App. Preparation (20 claims, 3 Indep.; 3.5 sheets of dwgs) | $5,000 *624* | | $1,000 | *Issue Fee Due | $300 | $1,320 |
| 1-2 | *1st Office Action; *2nd Office Action | $3,000 | | | | | |
| 2-3 | | | | | | | |
| 3-4 | | | | | *U.S. Year 3.5 Maintenance Fee (2.5 Issue yr + 3.5 yr) | $200 | $1,050 |
| 5-6 | | | | | | | |
| 6-7 | | | | | | | |
| 7-8 | | | | | *U.S. Year 7.5 Maintenance Fee (2.5 Issue yr + 7.5 yr) | $200 | $2,100 |
| 9-10 | | | | | | | |
| 10-11 | | | | | | | |
| 11-12 | | | | | | | |
| 12-13 | | | | | *U.S. Year 11.5 Maintenance Fee (2.5 Issue yr + 11.5 yr) | $200 | $3,160 |
| 13-14 | | | | | | | |
| 14-15 | | | | | | | |
| 15-16 | | | | | | | |
| 16-17 | | | | | | | |
| 17-18 | | | | | | | |
| 18-19 | | | | | | | |
| 19-20 | | | | | | | |
| 20-21 | | | | | | | |
| 21-22 | | | | | | | |

*Fig-27*

| | Germany | | | | | | |
|---|---|---|---|---|---|---|---|
| Time (year) | Germany Events | Germany Services | Germany Costs | Germany Events | Germany Services | Germany Foreign Associates | Germany Costs |
| 0-1 | *Filing *Examination | $70 | $2,468 $332 | *Granting; + Germany Annuity for Year 3 | $200 | $318 | $311 |
| 1-2 | *First prosecution; *Second Prosecution | $1,600 | $2,600 $0 | * Germany Annuity for Year 4 | $100 | | $215 |
| 2-3 | | | | * Germany Annuity for Year 5 | $100 | | $246 |
| 3-4 | | | | * Germany Annuity for Year 6 | $100 | | $303 |
| 5-6 | | | | * Germany Annuity for Year 7 | $100 | | $349 |
| 6-7 | | | | * Germany Annuity for Year 8 | $100 | | $409 |
| 7-8 | | | | * Germany Annuity for Year 9 | $100 | | $482 |
| 9-10 | | | | * Germany Annuity for Year 10 | $100 | | $543 |
| 10-11 | | | | * Germany Annuity for Year 11 | $100 | | $664 |
| 11-12 | | | | * Germany Annuity for Year 12 | $100 | | $846 |
| 12-13 | | | | * Germany Annuity for Year 13 | $100 | | $998 |
| 13-14 | | | | * Germany Annuity for Year 14 | $100 | | $1,150 |
| 14-15 | | | | * Germany Annuity for Year 15 | $100 | | $1,332 |
| 15-16 | | | | * Germany Annuity for Year 16 | $100 | | $1,514 |
| 16-17 | | | | * Germany Annuity for Year 17 | $100 | | $1,696 |
| 17-18 | | | | * Germany Annuity for Year 18 | $100 | | $1,878 |
| 18-19 | | | | * Germany Annuity for Year 19 | $100 | | $2,060 |
| 19-20 | | | | * Germany Annuity for Year 20 | $100 | | $2,242 |
| 20-21 | | | | | | | |
| 21-22 | | | | | | | |

Fig-28

| Rank | Assignee | Avg Of adjusted claim word count | St Dev Of adjusted claim word count | Count Of adjusted claim word count | Min Of adjusted claim word count | Max Of adjusted claim word count |
|---|---|---|---|---|---|---|
| 1 | Assignee #1 | 224.5 | 146.8 | 727 | 53 | 1411 |
| 2 | Assignee #2 | 246.4 | 127.2 | 550 | 67 | 1062 |
| 3 | Assignee #3 | 177.8 | 93.3 | 668 | 36 | 1023 |
| 4 | Assignee #4 | 194.7 | 85.5 | 278 | 61 | 524 |
| 5 | Assignee #5 | 154.0 | 74.3 | 586 | 45 | 782 |
| 6 | Assignee #6 | 255.8 | 136.1 | 471 | 47 | 989 |
| 7 | Assignee #7 | 217.9 | 125.3 | 420 | 50 | 720 |
| ⋮ | | | | | | |
| N | Assignee #N | | | | | |

Average of the Averages = 210.2. An assignee can see how well its claim breadth average compares to a cluster's overall average (independent of assignee)

Fig-29

COMPUTER-IMPLEMENTED PATENT PORTFOLIO ANALYSIS METHOD AND APPARATUS

CROSS REFERENCE TO RELATED APPLICATION

This application is a continuation of U.S. patent application Ser. No. 10/806,307 filed Mar. 22, 2004, which is a divisional of U.S. patent application Ser. No. 09/499,238, filed on Feb. 7, 2000. This application also claims the benefit of U.S. Provisional Application No. 60/119,210, filed on Feb. 5, 1999. The disclosure of the above applications is incorporated herein by reference.

TECHNICAL FIELD OF THE INVENTION

The present invention relates generally to a computer implemented system for analyzing patents. More particularly, the present invention relates to a computer implemented system for analyzing patents using linguistic and other computer techniques.

BACKGROUND AND SUMMARY OF THE INVENTION

Analyzing a patent portfolio of any significant size can be a time consuming task. Although patents are usually drafted to conform to certain stylistic rules, it still takes considerable time to review a collection of patents, particularly when the patent claims are also taken into account.

Managers of large patent portfolios need a way to organize their portfolios so that they and their business colleges can quickly grasp what the portfolio covers. In the past, it has been customary to construct a database for this purpose, listing each patent in the portfolio by patent number, title, inventor's name, issue data, and so forth. Much of the information contained in such a database may be captured from the face of the patent document itself and then displayed in tabular form. Of course, a very important part of every patent is its claims. While it may be possible to include the claims in a patent database of conventional design, doing so does not significantly enhance the database's value as a portfolio analysis tool for the following reason.

Unlike patent numbers, filing dates, and short titles, patent claims are comparatively verbose and thus not well suited for presentation in tabular form for quick review. Therefore, although the patent claims remain an important part of every patent in the portfolio, conventional at-a-glance portfolio analytic tools do not convey much information about the scope of the patent claims. While conventional database analytic tools will tell, for example, how many patents were applied for or issued in a given year, they will not tell much about the actual scope of what those patents cover. What is needed, therefore, is an analytic tool that allows patent scope to be quickly assessed, even when dealing with large portfolios.

Similar difficulties arise when reviewing patent office records for product clearance opinions. The attorney conducting the clearance opinion identifies potentially relevant patent classes and subclasses and then reviews the claims of the patents in those classes and subclasses to determine if any may be potentially pertinent. Whether the review is conducted using printed paper copies or electronic copies on line, the task is essentially the same. The attorney reviews the claims, patent by patent, until all of the potentially relevant ones have been considered. Frequently the patents are arranged in chronological order by issue date for example. Thus, there is likely to be little correlation from one patent to the next. Again, it would be desirable to have a tool that would present some easily grasped information about the claim coverage of each patent, so that the patents could be grouped or arranged in a more logical order for review.

The present invention provides such a tool. The patent portfolio analyzer of the invention analyzes selected claims of each patent, such as all independent claims of each patent, and associates with those claims additional claim scope indicia that the analyzer uses to control how the pertinent patent data is displayed.

In one embodiment, the indicia represents a claim breadth metric that may be used to, for example, sort the patent in order of increasing or decreasing claim breadth. In another embodiment the indicia may include patent category information, whereby patents may be grouped together according to meaningful topics or subjects. If desired, the topics or subjects can be technology categories, product categories or other business categories that are familiar to the audience that will be reviewing the results of the analysis.

The patent categories may be automatically generated and assigned using information extracted from the patents themselves. In a technology where the patent office patent classification system maps well onto the desired business categories, these may be used to automatically assign patents to the proper category. Alternatively, or additionally, linguistic analysis techniques may be applied to the text of the patents (e.g., claims, specification, abstract, title, or any combination thereof). Through use of linguistic analytic techniques, the semantic content of the patent text is extracted and used in assigning patents to one or more business categories.

Although a variety of different linguistic techniques may be used in this regard, one presently preferred embodiment uses dimensionality reduction techniques to produce eigenvectors representing patents of known classification. Thereafter, patents of unknown classification are classified by placing or projecting those patents into the eigenspace defined by the eigenvectors of the known patent text. One benefit of the eigenvector technique is that it captures a priori knowledge about population of patent text and then uses this knowledge in classifying the text of other patents. The eigenvector classification technique forms clusters of patents having similar meaning, so that the portfolio analyzer can display them suitably grouped together.

The claim breadth and patent clustering mechanisms may be used separately or together. In a presently preferred embodiment. the analyzer takes the form of a database having data structures designed to associate a claim breadth metric with at least the independent claims of each patent in the portfolio or pertinent patent collection. The database further includes at least one data structure for storing an associated classification identifier for each patent in the portfolio or collection. The user then views information about the patents in the portfolio using either a local copy of the database with suitable on-screen forms or using a remote copy of the database which may be accessed over the Internet or other suitable network in a client-server or web server-browser configuration. A collection of predefined queries may be provided to allow the user to view the portfolio data in a variety of different ways, as will be more fully described herein.

For a more complete understanding of the invention, its objects and advantages, refer to the following specification and to the accompanying drawings.

BRIEF DESCRIPTION OF THE DRAWINGS

FIGS. 8 and 9 are system block diagrams depicting patent portfolio analysis modules;

FIG. 10 is a table depicting the factor approach of the present invention;

FIG. 11 is a screen display depicting claim breadth analysis that uses a clustering technique of the present invention;

FIG. 12 is a screen display depicting claim breadth analysis after clustering has been applied;

FIG. 13 is a screen display depicting the displaying of a patent in greater detail;

FIG. 16 is a report depicting exemplary claims to be reviewed as identified by the teachings of the present invention;

FIG. 17 is a screen display depicting assignee and category time trend analysis;

FIG. 18 is a screen display depicting the results of an assignee and category 20 time trend analysis;

FIG. 19 is a series of interrelated bar graphs depicting a comparison of companies' patent portfolios;

FIG. 21 is a screen display depicting class and subclass information;

FIG. 22 is a screen display depicting assignee subclass analysis of the present invention;

FIGS. 23 and 24 are computer screens depicting exemplary costs associated with various filing profiles;

FIGS. 27 and 28 are input data configuration tables for interrelating patent prosecution costs and when the expenses occur; and FIG. 29 is a computer data sheet depicting statistics associated with assignee 10 claim breadth metrics.

DESCRIPTION OF THE PREFERRED EMBODIMENTS

Figure 1:
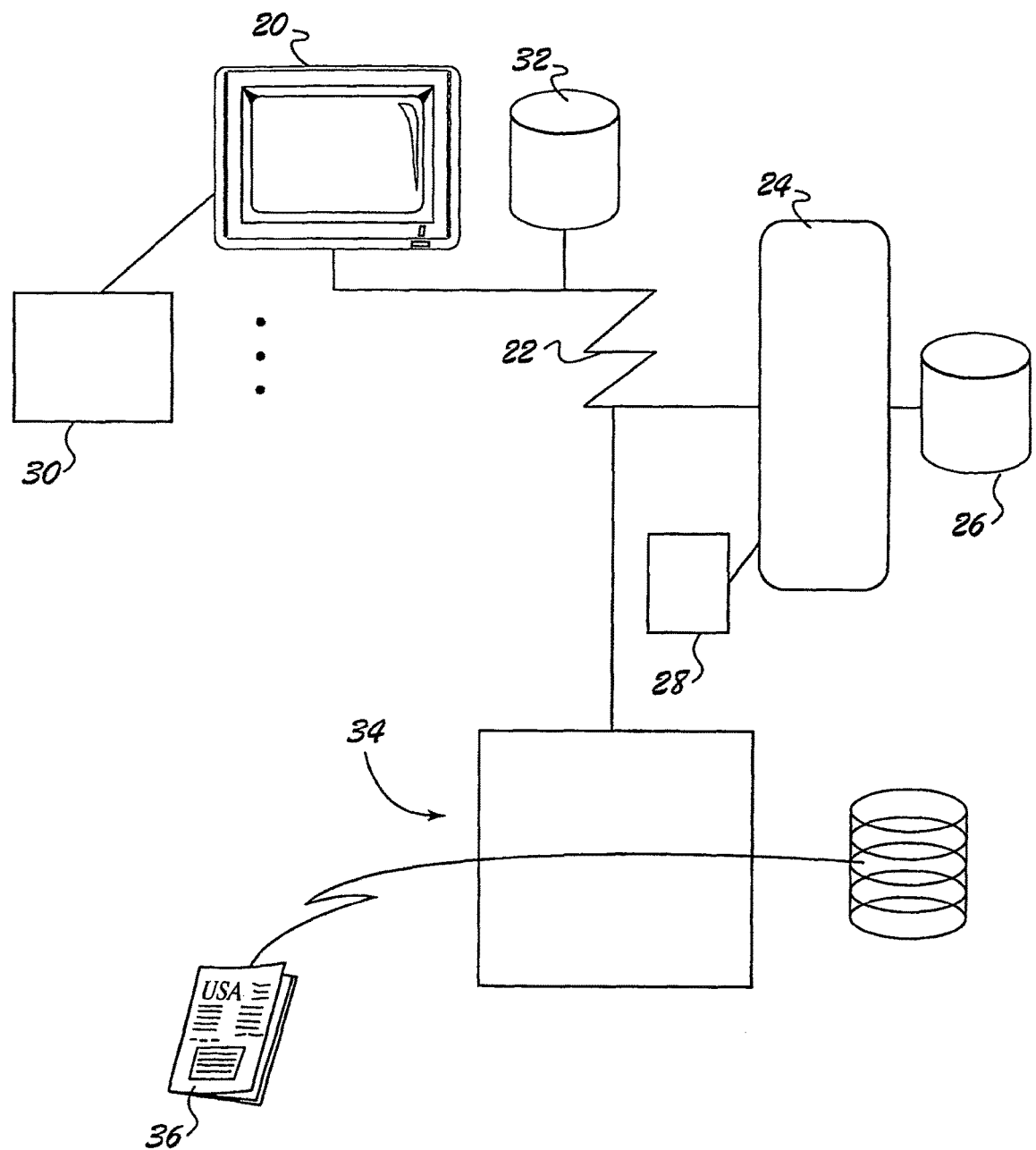
FIG. 1 is a system block diagram of an exemplary client-server implementation of the portfolio analysis apparatus.

Referring to FIG. 1, a client-server embodiment of the patent portfolio apparatus is illustrated. This embodiment is thus suitable for use in an Internet-based or network-based environment. While a client-server embodiment is illustrated here, it will be understood that the invention can also be implemented as a stand alone tool on a computer work station.

The client computer 20 is connected to a multi-user network 22, for communication with the server computer 24. The server computer and client can be coupled to a common local area network or wide area network. Alternatively, the client computer and server computer can be placed in communication with each other over the Internet. The server computer 24 can be a single computer (e.g., single processor) or a multiple computer system connected by suitable network such as the Internet. Associated with the server computer or server computer system is a storage unit 26.

The storage unit can be a disk storage unit or other data storage subsystem. The storage unit 26 can be a single storage unit, such as a single disk drive or RAID, or it can be a distributed system of storage units coupled through a suitable network such as the Internet.

Server computer 24 embodies the server application 28, which is a computer program or collection of computer programs running on the server computer 24 to provide the portfolio analysis functions that will be described more fully herein. The client computer 20 embodies a client application 30 which interacts with the server application 28 to receive data from the server application and provide information about the patent portfolio to the user via the computer screen or printed report. The client computer 20 may have an associated storage unit 32 in which the data received from the server application may be stored for off line viewing. The client application 30 may be a simple web browser configured to display information according to the attached formatting instructions (HTML or XML) supplied by the server application 28. In such an embodiment the browser essentially provides a display function and a printing function, with the portfolio analytic processes being performed by the server application 28.

In an alternate embodiment, the client application can receive Java applets, Active X components or other forms of executable code from the server application, allowing the client application to perform at least some of the portfolio analytic functions on client computer 20.

In yet another embodiment the client application and server application may be 20 both constructed using database management applications, such as Microsoft Access applications and/or SQL Server applications. In such an embodiment the server application supplies database files to the client application, and the client application is then able to perform data manipulations and portfolio analytic operations itself. Once the database files have been transmitted, the client application does not need to be in communication with the server application and may thus perform the analytic functions off line.

A further embodiment is the fully stand alone embodiment in which all of the analytic functions are defined within the local work station, thereby eliminating the reliance on a server application. This non client-server application may be suited for small offices or portfolio analytic projects that are comparatively static. For example, the portfolio under study may be processed (as will be more fully described herein) and stored as data in a lap top computer, allowing the user to carry the patent portfolio and the analytic tools to a meeting or to analysis the portfolio while commuting.

The presently preferred source of patent information for all of the above embodiments is an online database, such as the patent database maintained by the U.S. Patent and Trademark Office. The database, shown at 34, contains bibliographic and full text data of at least a portion of all issued patents, together with graphic images of the patents and accompanying drawings. The bibliographic information is typically associated with the front page of each patent, as diagrammatically illustrated at 36. The server application 28 performs queries upon the database 34, to extract pertinent patents for further analysis. As noted above, although separate client and server computers or computer systems are envisioned for most applications, it is also possible to implement the invention using a single computer. In such case, the single computer formulates and submits a query to the database 34, receives the results and then further processes them to provide the analytic functions.

While the embodiments illustrated here extract information from an on line database, such as the U.S. Patent and Trademark Office database, other sources of information are also envisioned. For example, the portfolio analysis system can extract information from other patent office databases (such as the Japanese Patent Office and the European Patent Office). In addition, the system can extract information from a corporate database of patent information, which can be made available through local area network connection. wide area network link or over the Internet. In addition, CD ROM and DVD ROM data sources can also be connected to allow information from those resources to be used as well.

Figure 2:
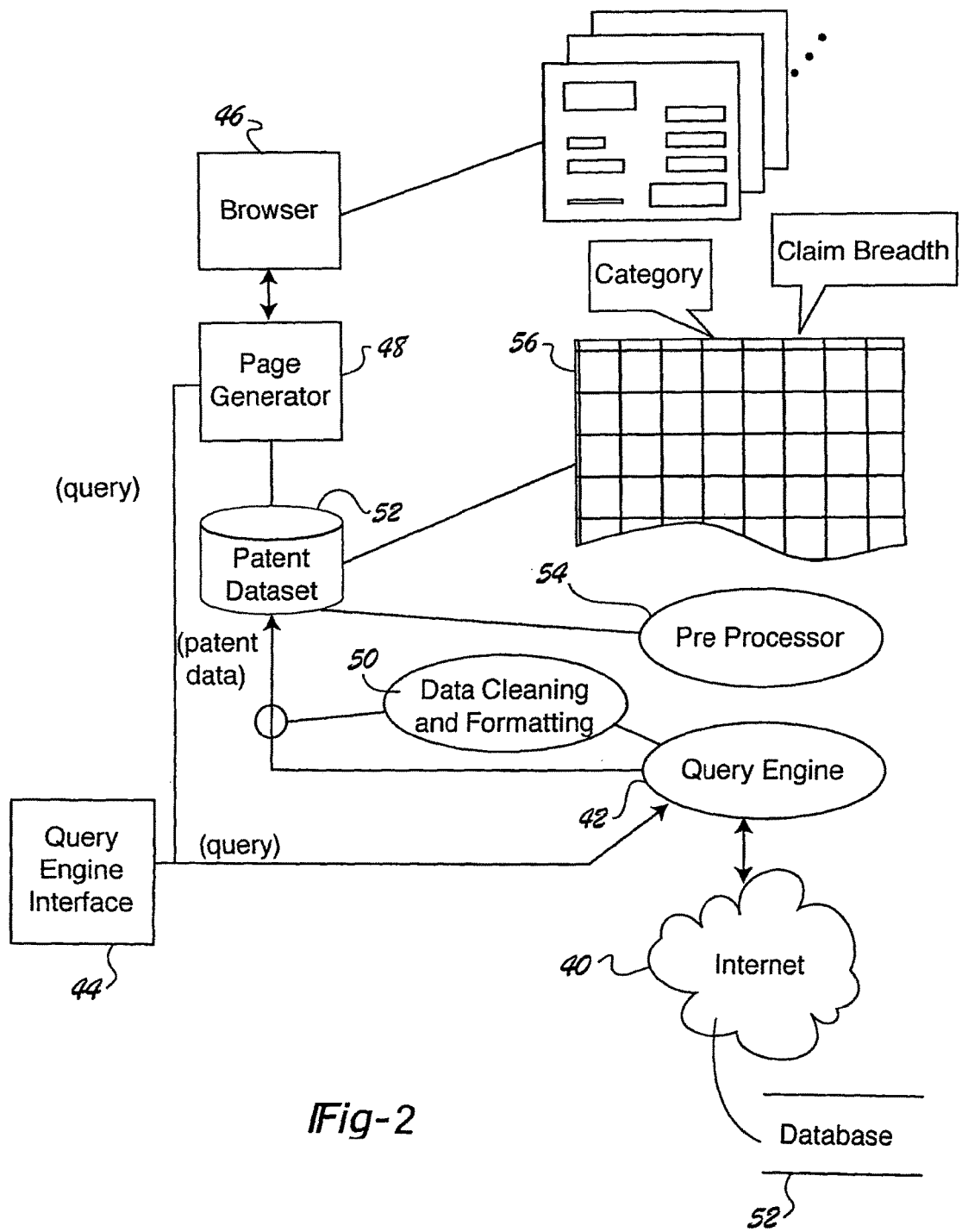
FIG. 2 is a data flow diagram providing an overview of the portfolio analysis method and apparatus.

The presently preferred embodiment obtains selected data records from database 34 and stores those as a patent dataset upon which the portfolio analytic processes are performed. FIG. 2 illustrates the basic data flow mechanism involved in this process. For purposes of illustration it will be assumed that database 34 is being accessed through the Internet 40 as illustrated. A query engine 42 obtains selected records from database 34, based on the user's input query. The query engine 42 may thus include a query engine interface 44 through which the user enters the criteria that will be used to extract information from database 34. The query might be, for example: all patent assigned to Assignee A; or all patents in U.S. Class 705. The query engine interface can be an interface dedicated to the query engine 42. Alternatively, the user may enter a query through a browser application 46. In an Internet-based embodiment, the server application 28 (FIG. 1) generates or supplies web pages that are selectively viewed on browser 46. One of these pages can be a query input page that links the results back to query engine 42. In FIG. 2, page generator module 48 is illustrated as supplying this function.

Once the query is submitted to the query engine 42 and the query engine extracts the pertinent records from database 34 a data cleaning and formatting process is performed on the data. In FIG. 2 the data cleaning and formatting module 50 associated with query engine 42 performs this function. The data is formatted for storing as the patent dataset 52. Thereafter, a preprocessor 54 manipulates the data in dataset 52 to analyze the patent data and add additional claim scope indicia and patent category indicia. In a presently preferred embodiment the dataset is maintained as a relational database having one or more tables, such as table 56 that stores patent category information and claim breadth metric information in association with each patent. In the presently preferred embodiment the claim breadth metrics are associated with each of the independent claims of a patent.

Figure 3:
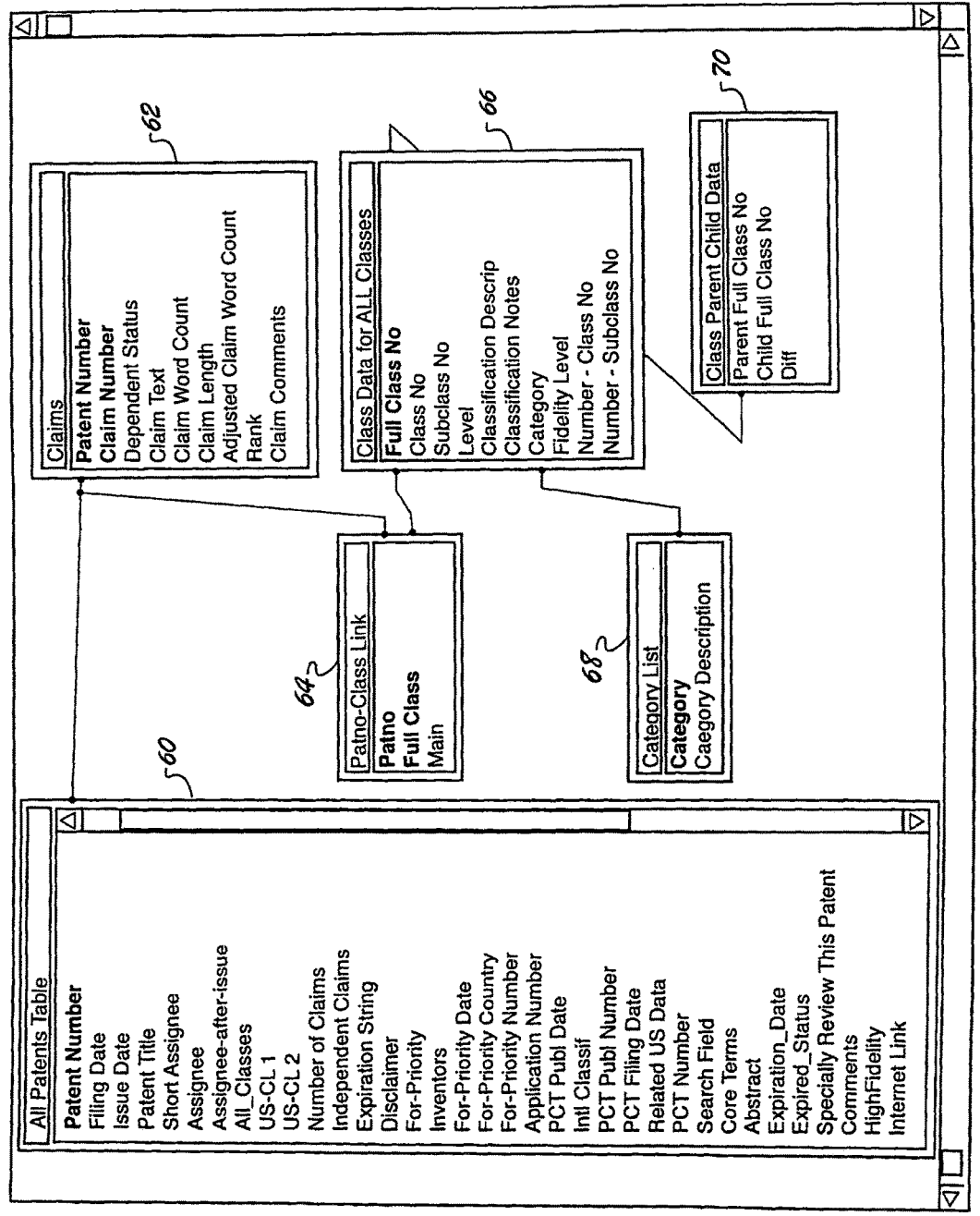
FIG. 3 is a data structure diagram illustrating the data structures and 20 relationships of a presently preferred embodiment.

FIG. 3 shows the presently preferred relational database structure. An All Patents Table 60 is linked by patent number to a Claims Table 62. Table 60 contains much of the bibliographic information found on the front page of each patent. The Claims Table 62 stores the claim text, and indicia as to whether the claim is independent or dependent, and an adjusted claim word count that is used as a claim breadth metric. The details of this metric are provided below.

Information about the patent class of each patent is stored in a patent number-10 class Link Table 64. This link table defines an association between each patent (by patent number) and the patent class to which that patent is primarily assigned. The patent class information is stored in table 66. Table 66, in turn, has a Category field that is linked to a Category List Table 68. This contains a description of each category as defined by the user or by the system designer. Examples of categories can include technological categories, product categories or other business categories that are familiar to the audience that will be reviewing the results of the portfolio analysis.

The presently preferred embodiment takes into account not only the patent class but also the patent sub class. Because patent classes and sub classes are often hierarchically arranged, table 66 includes a Level field that designates how many levels the particular sub class is from the top parent class. By way of illustration, in the following example, sub class 202 is at level 3 and sub class 206 is at level 4;

Top Level Parent Class (200)
Sub-level class (201)
  Sub-level class (202)
Sub-level class (203)
  Sub-sub-level class (204)
    Sub-sub-sub level class (205)
    Sub-sub-sub level class (206)

The relationships between class parent and class child are stored in table 70. These identify all child classes related to a given parent class. The system uses the parent-child class information when forming clusters based on classification. In one embodiment, the user can specify how many clusters are desired and the system will group patent sub classes together down to the appropriate hierarchical level to achieve the desired number of clusters.

Figure 4:
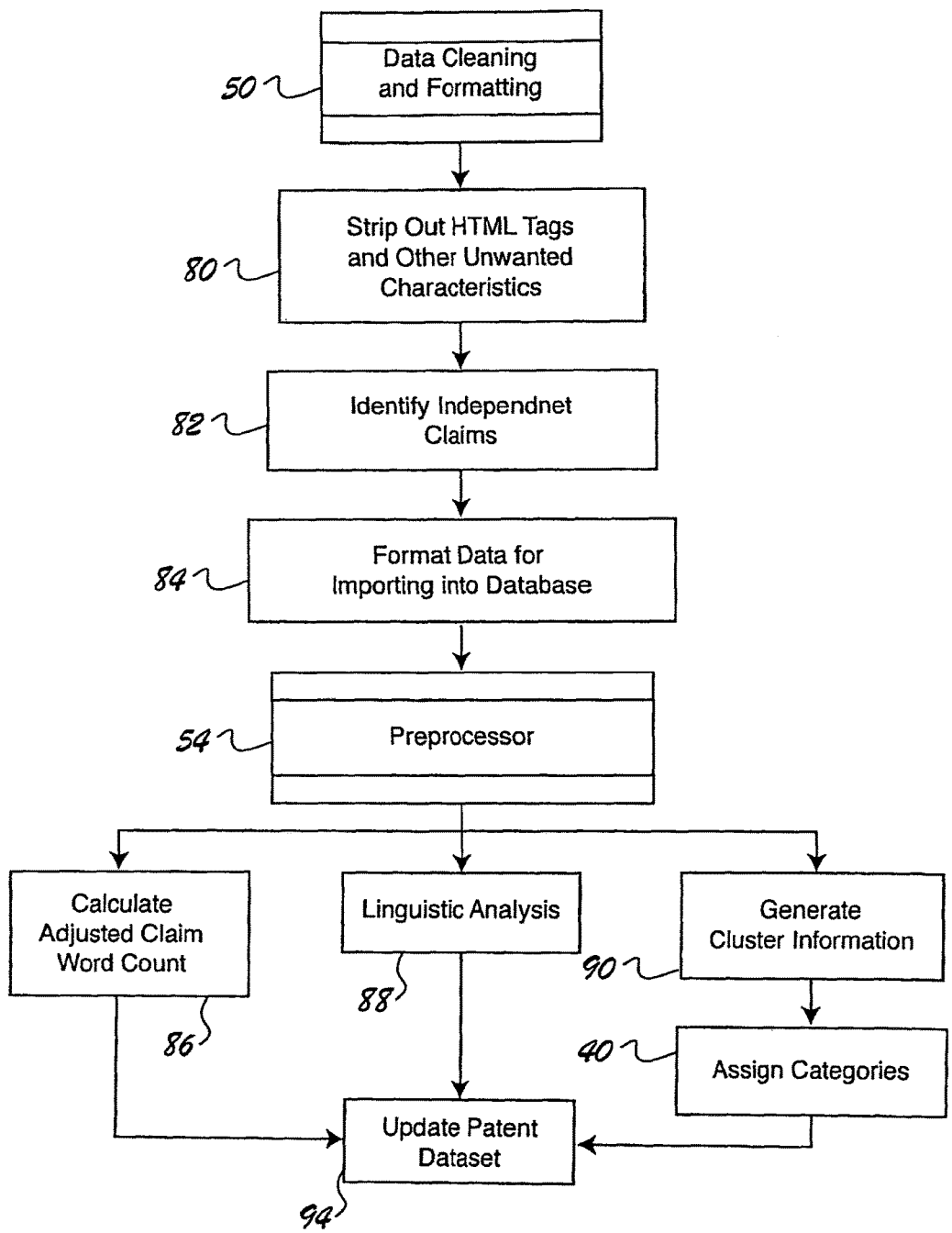
FIG. 4 is a flow chart diagram illustrating the data cleaning, formatting, and preprocessor operations.

FIG. 4 illustrates how the data cleaning and formatting operations (module 50 of FIG. 2) and preprocessor operations (module 54 of FIG. 2) are related in a presently preferred embodiment. The data cleaning and formatting process 50 includes a first step 80 whereby any HTML tags and other unwanted characters are stripped from the patent data obtained by the query engine. Many sources of patent data are designed to provide the information as alphanumeric text. Any delimiters or tags used to designate different fields within the text are stripped out by process 80, leaving only the pertinent data to be further processed. Next, at step 82, the data is scanned to identify independent claims. The presently preferred embodiment uses a scanning algorithm that identifies claims that refer to other claims and tags such claims as "dependent" claims. Next the data is formatted at step 84 50 that it may be stored in the patent data set 52 (FIG. 2). Formatting the data entails identifying which fields or sub strings of text within the retrieved data represent which fields in the dataset. More specifically, the patent data obtained by the query engine is parsed and assigned to the fields within the data tables illustrated in FIG. 3.

After the dataset has been populated, the preprocessing steps commencing at 54, are then performed on the stored data. The preprocessing steps can be performed sequentially or concurrently. FIG. 4 illustrates the steps as being performed concurrently or in parallel; however, the order in which the processes are performed may be varied to meet the design constraints of the particular embodiment being implemented.

One of the preprocessing steps calculates an adjusted claim word count at 86. 5 In the presently preferred embodiment, the independent claims are separately analyzed by breaking each into a preamble portion and a body portion. The number of words in the preamble and body portions are separately counted, weighting factors are applied to each count (e.g., preamble weight=0.5; body weight=1.0) and the resulting products are added together to yield the adjusted claim word count score for that claim.

The preprocessing steps 54 may also include linguistic analysis 88. This analysis is performed on the text of the independent claims to extract semantic content or meaning. One embodiment of linguistic analysis using an eigenvector analysis procedure that is described more fully below. Another linguistic analysis technique involves breaking the claim sentence into its respective parts of speech and then analyzing those parts of speech to electronically "diagram" the sentence. The results of such sentence "diagramming" may be stored in a data structure that shows which clauses are dependent on other clauses and how the clauses function grammatically within the sentence. This information is used to generate and assign probability scores to the clauses that are most likely to represent claim elements.

After extracting and assigning weights to the most likely claim elements, these elements may be compared with elements in other claims to determine to what extent those elements appear in other claims and how frequently. By assigning probability scores based frequency of occurrence, the system is able to assign a relative novelty score to each claim element. Doing this allows the system to provide the user with information on which claim elements are more likely than others to represent elements (or combinations of elements) that are not found in the prior art as exemplified by the other patents analyzed by the system. While the statistical analysis of claim elements is not intended to supplant the user's independent review of the claims as a whole, the information about which elements most probably represent new subject matter can be used to highlight these elements when the claims are presented for the user's review.

Often, this can make the reviewer's task easier, because he or she can begin by looking at the highlighted language to determine whether that claim needs to be considered further.

The preprocessor steps may also include a cluster generation step 90 that clusters or groups patents together that have common features, such as those belonging to certain patent classes/subclasses. By mapping collected patent subclasses into a common cluster and assigning that cluster a category name or descriptor, the system can then group patents by those names or descriptors when they are displayed to the user for review. This facilitates portfolio review by presenting related patents together so that their relationship to one another can better be grasped.

While clustering by patent classification information is very helpful, it is not the only way to define patent clusters. An alternate technique uses the eigenvector analysis procedure of the linguistic analysis module 88 to group patents together that fall within near proximity to one another in the eigenspace. The details of the eigenvector analysis are provided below.

After the preprocessing steps have been performed, the respective indicia (e.g., word count, linguistically derived semantic meaning, claim element probability scores, and cluster assignments) are written to the patent data set through updating operation 94.

After the preprocessing steps have been performed, the patent data set is ready 25 for use. Referring back to FIG. 2, the user can access the data set 52 using a suitable browser 46. As previously discussed, the client application generates pages or screens that are viewed by browser 46. The user interacts with the screens by filling in query requests and/or by clicking on control buttons in the user interface, to request information according a variety of different formats. The server application then supplies the user with the requested information by generating additional pages or screens of information and/or by providing data in tabular form suitable for printing. Examples of such pages or screens are provided in the figures and described at the end of this document.

By way of further explanation, FIGS. 5-9 depict detailed data flows of the computer-implemented patent portfolio analysis system of the preferred embodiment.

Linguistic analysis techniques are combined with other techniques in order to categorize and/or analyze a plurality of patents or patent applications. In order to achieve a higher quality of associating patents with proper categories, the preferred embodiment of the present invention utilizes a multi-tiered approach.

Figure 5:
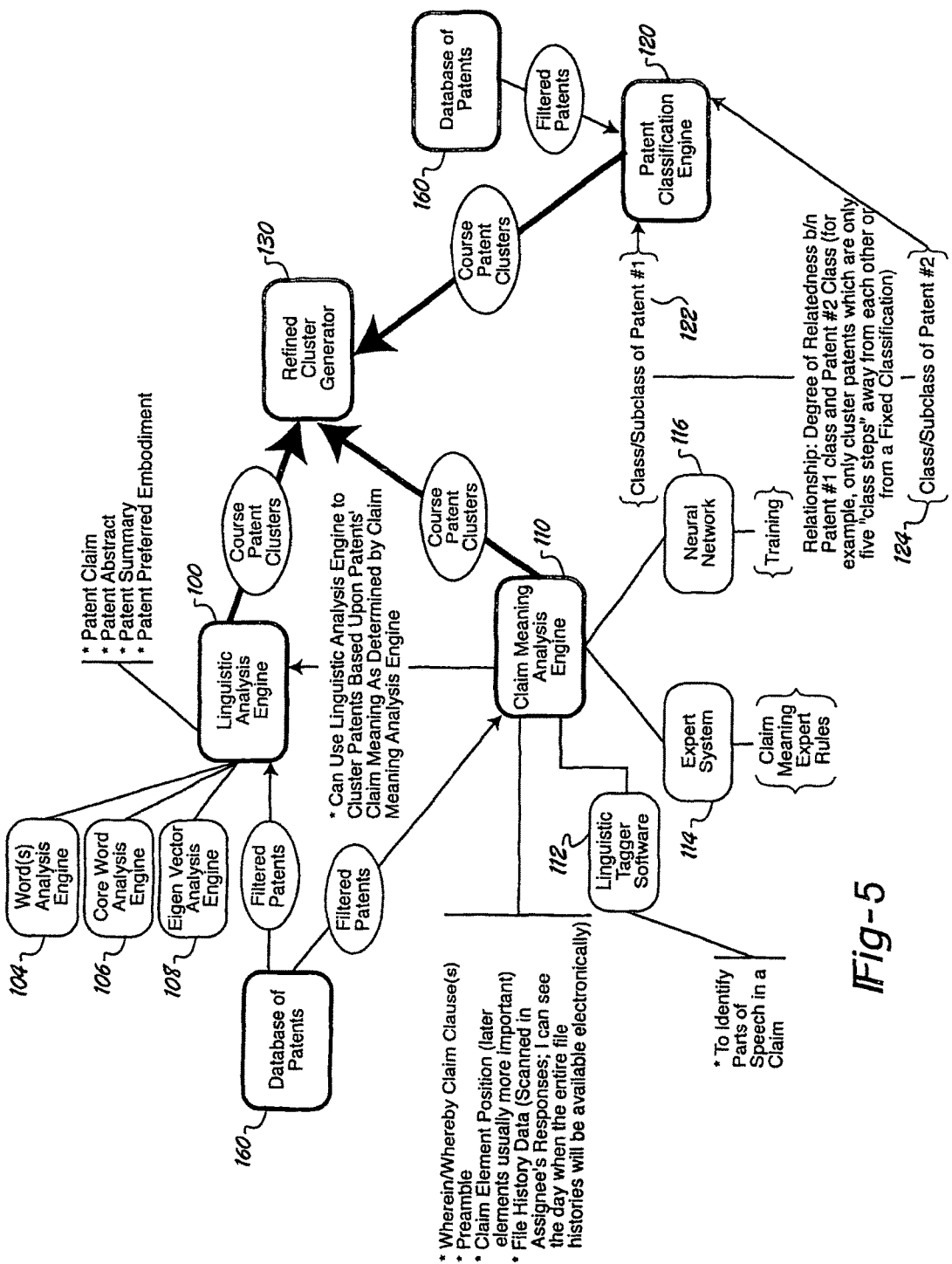
FIG. 5 is a system block diagram for generating clusters according to the teachings of the present invention.

FIG. 5 depicts a linguistic analysis engine 100 generating coarse clusters of 15 patents which have been grouped according to linguistic similarity. Linguistic analysis engine 100 may examine one or more of the following sections of a patent in order to determine which patents are similar based upon linguistic analysis: claims; abstract; summary; preferred embodiment; and/or background of the invention. In the preferred embodiment, linguistic analysis engine 100 examines the claims and abstracts of the patents.

Linguistic analysis engine 100 uses one or more of the following types of linguistic engines: a word or words engine 104; a core word engine 106; and an eigenvector analysis engine 108. Word analysis engine 104 examines whether patents have similar types of words in common. Word analysis engine 104 preferably utilizes a thesaurus in order to more flexibly determine that a group of patents utilizes similar words. For example, but not limited to, word analysis engine 104 may have within its thesaurus as approximate synonyms the terms memory and storage.

Core word analysis engine 106 produces clusters based upon predetermined patent sections containing similar word roots. For example, but not limited to, with a first patent containing the word "fastener" and a second patent containing the word "fasten", core word analysis engine 106 determines that these two words contain the same root word fasten and clusters the two patents based upon the two patents sharing a certain number of root words.

Eigenvector Analysis

Figure 6:
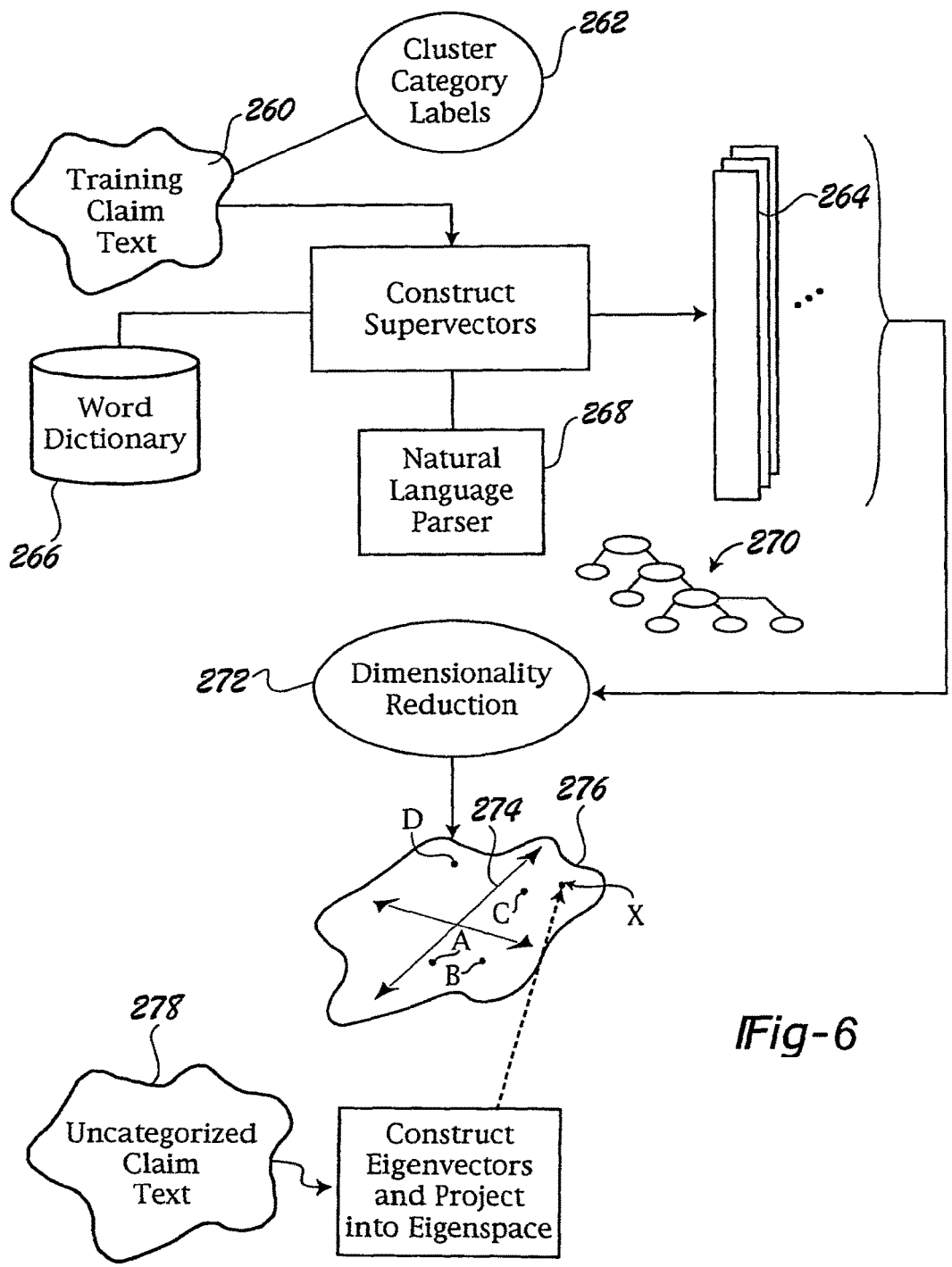
FIG. 6 is a system block diagram for constructing eigenvector.

An eigenvector analysis engine 108 produces clusters based upon a dimensionality reduction technique that yields a plurality of eigenvectors that represent the claim space occupied by a plurality of patent claims that have already been labeled as belonging to a known cluster or category group. With reference to FIG. 6, the technique works as follows.

A corpus 260 of training claims is assembled containing representative examples of the entire claim population with which the patent portfolio analyzer is intended to operate. The training claims can be selected from actual patents, or they may be drafted specifically for the training operation. Each claim in the training corpus may be labeled according to the user's pre-assigned cluster categories 262. Later, when the eigenvector system is used, uncategorized claims are projected in the eigenspace and associated with the closest training claim within the eigenspace. In this way, the uncategorized claim may be assigned to the category of its closest categorized neighbor.

To construct the eigenspace we first form supervectors 264 representing distinguishing features of a claim using a predefined format. The predefined format, itself, is not critical. Any suitable format maybe used provided that such format is used consistently for all claims in the training corpus and all claims later being categorized by eigenspace projection.

In one form, the supervector for each claim may consist of a one dimensional 5 array of integer values, where each integer corresponds to one word in the claim. The array of integers may be indexed in the order that the words appear in the claim. Integer numbers may be assigned to words by first forming a dictionary 266 of all words found in the training corpus, deleting any noise words (such as articles or short prepositions), alphabetizing the dictionary and then sequentially assigning integer numbers.

In this embodiment, a predefined maximum array size may be established, so that the supervectors for all claims will have the same number of array elements. Claims having fewer words than the maximum array size are handled by inserting a null character in each array element that does not contain a word integer. Claims that exceed the maximum array size are truncated at the maximum array size, using the final element of the array as a flag to indicate overflow. A suitable overflow character may be selected for this purpose.

Alternatively, a supervector may be constructed by defining a one dimensional array of size equal to the number of words in the claim language dictionary. The array is then populated by integer numbers indicating the number of times each word appears in he claim. This will, of course, result in an array that is populated by many zeroes as most claims do not use all words in the claim dictionary.

The above two alternative supervector configurations produce fairly large structures. However, these large structures are reduced in forming the eigenspace to a set of eigenvectors equal in number to the number of claims used in the training corpus.

Although this dimensionality reduction step is computationally expensive, it only needs to be performed once to define the eigenspace.

A third alternate embodiment employs a supervector that is based on a preprocessing step whereby each claim is reduced to its component parts of speech using a natural language parser 268. The resulting tree structure 270 may then be parameterized and stored as elements of the supervector, along with the respective word integers occupying each node of the tree. In effect, parsing the claim produces something similar to a grammatical sentence diagram in which the relationships and grammatical function of sentence fragments and phrases are revealed.

After supervectors have been generated for each of the training claims, a suitable dimensionality reduction process 272 is performed on the supervectors.

Principal component analysis is one such dimensionality reduction process. There are others. Dimensionality reduction results in a set of eigenvectors 274, equal in number to the number of claims in the training corpus. These eigenvectors define an eigenspace 276 that represents the claim scope occupied by the respective members of the training corpus. The eigenspace is an n-dimensional space (n being the number of claims in the training corpus). Each of the n dimensions is defined by the dimensionality reduction process (e.g. principle component analysis) to maximally distinguish claims from each other.

After the eigenspace has been constructed, each claim in the training corpus may be projected into that space by performing the same dimensionality reduction process upon the supervector for that one claim. This places each claim as a point (A, B, C . . . ) within the n-dimensional eigenspace. Each point may be labeled with its corresponding cluster or category designation. Thus regions within eigenspace near a given labeled point represent subject matter that is likely to be similar to the subject matter of the claim that defined the given point.

After the eigenspace is constructed and all known points have been placed into that space and labeled. the system may be used to analyze uncategorized claims. This is done using the same procedure that was used to place categorized claim 278 into the eigenspace. Thus the uncategorized claim is processed to generate its supervector and that supervector is dimensionality reduced (e.g. through principle component analysis) and placed into the eigenspace. Next, a searching algorithm explores each of the labeled points in close proximity to the newly placed point to determine which is the closest. A geometric distance (in the n-dimensional space) may be used to determine proximity. If the newly projected claim (point X) is within a predefined proximity of the closed training claim point (e.g., point C), it may be assigned to the cluster or category of the training claim. If the newly projected point is outside a predefined threshold from its closest neighbor, suggesting that the new claim is not all that similar to the existing claims, then the new claim is not assigned to the closest neighbors category. Rather, the new point is treated as a new cluster within the eigenspace. After the system has been used for a while, the user may manually examine the content of new clusters, giving them labels that may be subsequently used for further claim processing.

With reference to FIG. 5, Linguistic analysis engine 100 produces coarse patent clusters based upon utilizing one or more of the aforementioned engines, (e.g., engines 104, 106, 108). Moreover, the term coarse in "coarse patent clusters" is utilized within the present invention to designate that the patent clusters produced from linguistic analysis engine is preferably subsequently refined by subsequent processes according to the teachings of the present invention. However it is to be understood that the present invention also includes directly using a coarse patent cluster to analyze patents via clusters.

Linguistic analysis engine 100 can in an alternate embodiment use not only the aforementioned linguistic engines but also separately or in concert with the aforementioned linguistic engines a claim meaning analysis engine. A claim meaning analysis engine 110 examines one or more claims of a patent in order to determine the meaning or semantics of the claim. For example, but not limited to, claim meaning analysis engine 110 examines the words contained within a "wherein~~ or "whereby~~ claim clause in order to partially or wholly determine the meaning or gist of a claim. Moreover, a claim's preamble can be examined to determine claim meaning, as well as using claim element position to determine claim meaning since typically claim elements which appear later in a claim contain the more important components. Also, if file history data is available electronically, then responses to office actions can be examined to determine what claim limitations were most important in order to make a patent distinguishable over the prior art. Claim meaning analysis engine can use one or more of these aspects (e.g., wherein analysis, preamble analysis, etc.) in order to best determine the meaning of a claim. Each of these aspects can be weighted to make one aspect more predominant in determining the meaning of a claim.

Claim meaning analysis engine 110 can utilize a linguistic tagger software 112 in order to identify parts of speech in a claim such as identifying a "wherein" or a "whereby" clause as well as relative purpose clauses (which clauses can be used to determine a chief purpose for one or more elements of a claim). One linguistic tagger software package is obtainable from such sources, but not limited to, the Xtag software package from the University of Pennsylvania.

Moreover, an expert system 114 can be used alone or in concert with linguistic 20 tagger software 112 in order to determine the meaning of a claim. The expert system 114 includes claim meaning expert rules in order to identify the meaning of the claim. For example, a claim meaning expert rule includes a larger weighting factor being applied to a phrase which is: part of a wherein clause and the wherein clause appears in the last portion of the claim.

Another exemplary non-limiting claim meaning expert rule is where a claim element utilizes similar words to the words which appear in a claim's preamble. The expert system would more heavily weight such a claim element since a claim element which discusses the goal of the preamble is more likely to be an important element.

Claim meaning analysis engine 110 also includes in an alternate embodiment a neural network 116 being utilized either alone or in concert with linguistic tagger software 112 and/or expert system 114 in order to determine meaning of a claim. The neural network 116 is preferably a multi-tiered neural network with hidden layers whose weights have been adjusted due to training. Training includes processing a predetermined number of patent claims and/or patent abstracts through a multi-tiered hidden layer neural network and adjusting the weights based upon how well the neural network has determined the meaning of the claim.

Claim meaning analysis engine 110 provides the meaning of each claim of a patent to linguistic analysis engine 100 so that linguistic analysis engine can use one or more of its engines to produce coarse patent clusters. Moreover, in still another alternate embodiment of the present invention, claim meaning analysis engine 110 produces its own coarse patent clusters based upon which patent claims have similar meanings.

The preferred embodiment of the present invention includes a patent classification engine 120. Patent classification engine 120 is utilized by the present invention preferably in combination with linguistic analysis engine 100 and claim meaning analysis engine 110 in order to determine with high fidelity which patents belong in the same cluster. Patent classification engine 120 examines the United States Patent classification of a patent 122 relative to the classification of another patent 124 or relative to a predetermined classification in order to determine whether the first patent should be placed in the same cluster as another patent. Patent classification engine 120 examines this relationship by determining the degree of relatedness between two United States patent classifications. For example, a cluster of patents will be obtained for those patents which are only five "class steps" away from each or from a predetermined classification. Within the present invention, the term class step refers to the tree-like structure of the United States patent classification wherein a parent-child relationship within such a classification system would constitute one class step.

In another embodiment, patent classification engine 120 clusters based upon a user explicitly designating one or more patent subclasses to constitute a cluster. In this approach, any patents in those designated subclasses are considered part of the cluster.

In an alternate embodiment, patent classification engine 120 examines the International Classifications of patents either alone or in concert with the U.S. Patent Classifications.

In another alternate embodiment, the search notes produced by the United States Patent Office are used to determine which classifications relate to one another.

Figure 7:
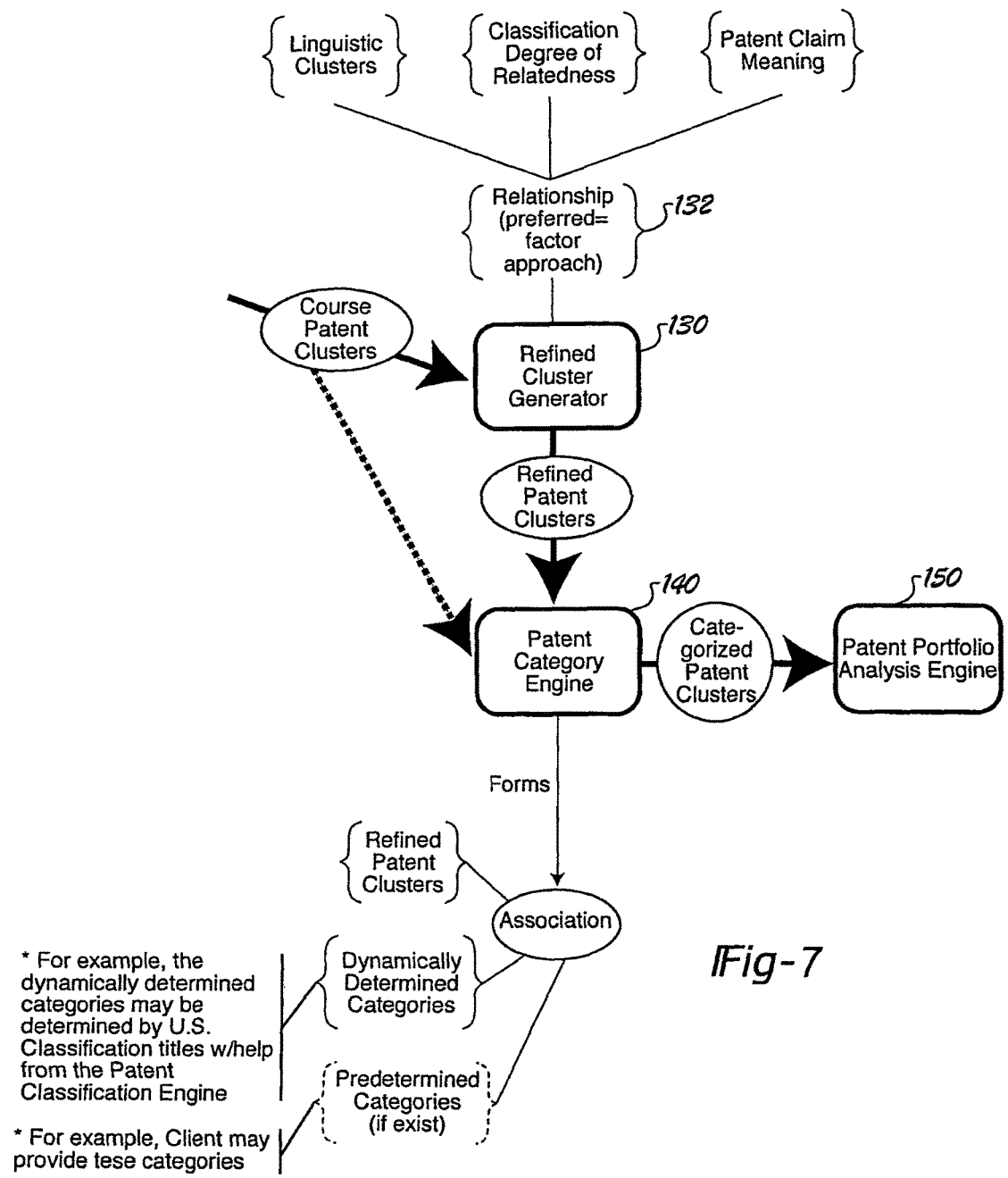
FIG. 7 is a system block diagram for categorizing patent clusters generated according to the teachings of the present invention.

The coarse patent clusters from one or more engines 100, 110, and 120 are provided to refined cluster generator 130. With reference to FIG. 7 refined cluster generator 130 produces refined patent clusters based upon the coarse patent clusters which are available from one or more of the aforementioned engines. Refined cluster generator 130 produces refined patent clusters based upon a relationship 132 among the linguistic clusters, the clusters from the classification degree of relatedness, and clusters from the patent claim meaning engine. Refined cluster generator 130 utilizes in the preferred embodiment a factor approach wherein different weights are attributed to each of these different types of clusters. For example, linguistic clusters may be weighted with a higher factor value than a cluster from the patent claim meaning engine. These factor values allow clusters from different types of engines to be utilized according to how well the engine can cluster for the application at hand.

Moreover, the present invention in the preferred embodiment utilizes factor values within the clusters from the linguistic analysis engine. For example, linguistic analysis engine produces a score for each patent on how well a patent fits within a particular cluster. A factor value is preferably used to indicate how well that patent fits within a linguistic cluster. An exemplary factor approach includes a factor value of 1 being given to a patent whose cluster score indicates an excellent fit within the cluster. A factor value of 0.75 is associated with a patent with only a good cluster score. A factor value of 0.5 is associated with the patent which has only an average cluster score. A factor value of 0.25 is associated with a patent with a below average cluster score and a factor value of 0 is associated with a patent whose cluster score is extremely poor.

Refined cluster generator 130 is able to produce a more refined patent cluster 10 than any of the engines since refined cluster generator 130 produces clusters based upon more information than is available to any one engine. Refined cluster generator provides the refined patent clusters to patent category engine 140. However, it is to be understood that in an alternate embodiment, patent category 140 can directly use coarse patent clusters from one or more of linguistic engines 100, 110 or 120 (not shown) in order to associate categories with the clusters.

Patent category engine 140 associates each refined patent cluster with a category. A category may already exist, for example, through a client previously providing certain categories. The present invention also includes dynamically determining the categories, for example, by using the United Stated patent classification titles which are found for each patent within a particular cluster. Moreover, categories may be dynamically determined by examining the key core words or key words associated with a cluster produced from linguistic analysis engine and/or claim meaning analysis engine (not shown).

In an alternate embodiment, both predetermined categories and dynamically determined categories are utilized since the predetermined categories may not address all of the clusters.

Patent portfolio analysis engine 150 receives the categorized refined patent clusters from patent category engine 140. Patent portfolio analysis engine 150 examines the patents in each cluster by determining, for example, how one assignee's patents have clustered in each category with respect to a second assignee's patents. In the preferred embodiment, patent portfolio analysis engine includes a patent portfolio comparison analysis engine in order to perform that function.

With reference to FIG. 8, patent portfolio analysis engine 150 preferably includes a claim breadth analysis engine in order to analyze the breadth of each patent claim. Claim breadth is important for example, for determining which patents are the broadest and hence more likely to be infringed. Claim breadth analysis engine 152 in one embodiment examines the number of words of a claim in order to provide an indication of how broad a claim is. In the preferred embodiment, an adjusted claim length is utilized wherein the number of words in a claim's preamble is accorded less weight. Preferably, claim breadth analysis engine 152 reduces the total number of words in a claim by half of the number of words in a claim's preamble.

Claim breadth analysis engine 152 in an alternate embodiment includes clusters which in a Cartesian graphical format represent clusters with a centerpoint and a varying or non-varying radius about that centerpoint which represents the cluster's patents which are the furthest distance on a linguistic basis from the cluster's center point. The present invention examines the average length of the cluster based upon this Cartesian representation in order to determine claim breadth. Both the average length of the cluster and the adjusted word count are utilized in the preferred embodiment to determine which claims are the broadest.

Patent portfolio analysis engine 150 includes patent portfolio comparison analysis engine 154. Patent portfolio comparison analysis engine 154 provides an assessment on how one Assignee's patent portfolio has clustered relative to another Assignee's patent portfolio. For example, the present invention has clustered the first Assignee's patent portfolio and has generated a cluster of the Assignee's patents that relate to Internet E-Commerce. The present invention has also clustered a second Assignee's patent portfolio to designate which ones are in the E-Commerce cluster. 5 Patent portfolio comparison analysis engine 154 then generates in a tabular and graphical format a breakdown of the number of patents each Assignee has filed and in which years.

Patent portfolio engine 150 includes a patent classification analysis engine 156. Patent classification analysis engine 156 provides in a tabular or graphical format in which subclasses an Assignee has its patents.

With reference to FIG. 9, patent portfolio analysis engine 150 preferably includes a patent portfolio financial engine 170. Patent portfolio financial engine 170 analyzes the cost associated with an Assignee's patent portfolio both on a cluster and non-cluster basis. In other words, an Assignee can determine how much it has spent for its entire patent portfolio on an overall basis, as well as determine how much it has spent obtaining patents in a particular cluster (e.g., Internet E-Commerce patents). Similarly, an Assignee can determine how much one or more of its competitors has spent on the competitor's entire patent portfolio or within a particular cluster.

Patent portfolio financial engine 170 also performs forecasting and in the 20 preferred embodiment, automatically analyzes an Assignee's patent portfolio (either or both on an entire portfolio basis or on a cluster-by-cluster basis) to determine patent filing trend analysis. For example, if an Assignee has been increasing the number of filings per year, patent portfolio financial engine 170 fits a line or other polynomial function to the historical Assignee filing data in order to determine for the future years what the anticipated number of filings is. The filing prediction functionality is performed by filing prediction module 172.

The user can choose to override the automatically determined filing predictions and either replace all or a portion of the predicted results with numbers that the user has determined for itself. In this manner, an Assignee can determine both the Assignee's as well as competitors' historical, present, and future financial aspects associated with their respective patent portfolios.

Patent portfolio financial engine 170 utilizes patent filing cost data, such as United States patent filing costs, PCT (Patent Cooperation Treaty), and other foreign filing costs (e.g., Germany and European Patent Office costs). The timing of when those costs are applicable to a particular filing, are associated with the respective filing cost data. Moreover, patent data typically includes which law firms have worked upon which patents. Accordingly, cost data 174 is modified to reflect what that law firm typically charges for a patent application. In the preferred embodiment, the location of the law firm that worked upon a patent is placed within a region and the typical cost associated with that region is used to modify the cost data 174. For example, if the law firm is located in New York City, the cost for prosecuting a patent application will be increased by a predetermined factor versus a law firm that is located in a region of the mid-west. However, it is to be understood that the present invention also includes utilizing cost data associated with each law firm in order to modify the cost data 174.

Patent portfolio analysis engine 150 includes searching the Internet (Internet 20 usage engine 182) for locating products associated with the patent or locating references relevant to one or more patents. Internet usage engine 182 automatically constructs an Internet hyperlink for linking between the patents in the present invention's database to patent information contained on another's database. For example, Internet usage engine 182 dynamically constructs a link from a patent in the present invention's database to the full text of the patent on the United States Patent and Trademark Internet database or in an alternate embodiment to also the IBM Internet Patent database. Moreover, the database can dynamically construct an Internet link from a patent in the present invention's database to the images of the patent on the United States patent Internet database or to images on the IBM Internet Patent database. Still further, Internet usage engine 182 dynamically constructs an Internet hyperlink between a patent in the present invention's database to the patent's Assignee's web page. For this functionality, domain name search engine 184 and an Internet search engine 186 are used to determine the most likely Internet website of the Assignee. Domain name search engine 184 utilizes the name and location of the Assignee provided by the present invention's database to determine which domain names are most likely owned by the Assignee of the patent. Preferably, Internet search engine 186 utilizes the key words as generated by the linguistic and other engines of the present invention as well as the Assignee's name to locate matching web pages. A comparison between the results of the domain name search engine 184 and the results of the Internet search engine 186 are used to determine the most likely candidates for on which web pages an Assignee is operating.

Internet usage engine 182 includes the additional functionality of searching Internet web pages that are relevant for infringement analysis and validity analysis. Internet usage engine 182 performs product coverage and infringement analysis via module 188. Module 188 searches for Internet web pages that contain product descriptions that match or are significantly similar to the claim linguistic results. As generated by engines 100, 110, and 120 (not shown). Preferably, Internet search engine 186 is supplied key words by engines 100, 110, and 120 (not shown). The search can be narrowed based upon user-supplied competitor names and/or product names. In an alternate embodiment, the claims at issue are submitted to the aforementioned linguistic engines in order to obtain the first set of linguistic results. Second linguistic results are obtained by submitting to the aforementioned linguistic engines the web page or web pages that describe a client's product that is covered by the claims at issue. The Internet is then searched using the first results via Internet search engine 186 and the search using the second set of linguistic results via Internet search engine 186. The web pages that are retrieved from the first set of results are compared with the web pages that are obtained from the second set of results. The web pages that are in both sets of search results are then provided to the user as being the most likely candidates for possible infringement of the claims at issue.

Internet usage engine 182 includes a claim validity analysis module 190. Module 190 uses Internet search engine 186 to automatically search the Internet for content that matches or are significantly similar to the linguistic results of the patent claims at issue from the aforementioned linguistic engines. Preferably, patent priority data, such as patent filing date or foreign filing priority date, are used to focus the Internet searching. Examples of Internet search engines include, but are not limited to, the Internet search engine provided by AltaVista.

With reference back to FIG. 8, a database of patents 160 is provided which has United States patent information and foreign (e.g., PCT) patent and foreign (e.g., PCT) patent application information. Database of patents 160 is utilized to identify which patents are the most "important" since there is a relationship between importance of a patent and in how many countries a patent has been filed.

In an alternate embodiment of the present invention, patent portfolio analysis engine 150 is utilized without the clustering technique and is utilized primarily only with database of patents 160. This alternate embodiment is utilized typically when patent portfolio analysis is performed without clustering. This may be done when only claim breadth analysis without categorization is satisfactory for the application at hand.

A filter 162 is used in order to reduce the number of "noise" patents which are identified as the result of key word patent searching. Filter 162 identifies high fidelity and low fidelity patents by constructing high fidelity search strings to obtain high fidelity patents and place them into one portion of the patent database. A lower fidelity search strategy is run to obtain lower fidelity patents and place them into a separate portion of the database. The lower fidelity patents then can be examined on a more individual basis within the database to determine whether the patents belong in the patent portfolio analysis.

For example, a high fidelity search string includes United States patent classifications whose patents are probably all high fidelity. Moreover, a high fidelity search string may include an assignee where it is already known that all patents of that assignee are highly relevant. As shown on FIG. 5, the engines 100, 110, and 120 which produce the coarse patent clusters use as input the filtered patents from the filter. However, it is to be understood that the present invention also includes not providing filtered patents to the engines 100, 110, and 120. For example, engines 100, 110, and 120 can examine the entire universe of patents or the engines can examine the patents of particular assignees.

With reference back to FIG. 8, patent portfolio engine 150, using the information from patent category engine 140 (not shown) and from the database of patents 160, produces in the preferred embodiment the following types of reports 170: claim breadth analysis reports; patent portfolio comparison reports; and patent clearance 20 reports. Claim breadth analysis reports indicate such items as the client's broadest claims which may be the best candidates for which patents a competitor is most likely to infringe. Also this report can indicate the client's longest (i.e. narrowest) claims which are probably the best candidates to discontinue to pay maintenance fee payments. Moreover, claim breadth analysis reports may indicate the competitor's shortest claims which may be the best candidates for which patents the client is most likely to infringe.

Patent portfolio comparison reports include a comparison of the number of client's and competitor's patents for each category on: a raw total number basis; and a difference number basis. Also this report includes a time trend analysis whereby for each year in a predetermined time interval the number of patents of a client and of a 5 competitor is examined for each category.

Patent clearance reports assist a patent attorney in a freedom-to-practice study since patent clearance reports obtain relevant patents for the study which have been processed by the filter and which are sorted by United States patent classification so that the patent attorney can more quickly examine the claims of each of the relevant patents. Moreover, patent clearance reports can be sorted by claim breadth so that the shortest claims (which are more likely to be broader) are examined first.

EXAMPLE

A core word linguistic software engine grouped patents into clusters based upon patent claims and abstracts. However, it should be understood that the present invention is not limited to only clustering on patent claims or patent abstracts but can cluster on any part of the patent. Moreover, two different clustering approaches were used. The first approach was to have patents assigned to one or more clusters. The second approach assigned patents to the one cluster with which the patent was most strongly associated.

The core word linguistic software engine produced two files: a clustered patents file and a core word keywords cluster file. A clustered patents file contained: cluster number, cluster score patent number, assignee, patent title.

| Cluster Number | Cluster Score | Patent Number | Assignee | Patent Title |
|---|---|---|---|---|
| 1 | 16.3 | 5,122,976 | Assignee A | Method and apparatus for remotely controlling sensor processing algorithms to expert sensor diagnoses |
| 1 | 37.8 | 5,107,497 | Assignee B | Technique for producing an expert system for system fault diagnosis |

Patents are clustered based upon claim or abstract text. The table below shows an example of a clustered patent file.

A second file contains core word keywords cluster file. The cluster's keywords are used to categorize each cluster. The fields of the second file preferably include: cluster number and key words. The table below shows an example of core word keywords in a cluster file.

| Cluster Number | Keywords |
|---|---|
| 1 | Exper diagn compute store faul fail syst data address receive share retrieve |

An initial set of categories is generated for each cluster. Since many clusters may be generated by the linguistic analysis engine, more general categories are preferably established to more easily analyze and portray the patent portfolio results. In the preferred embodiment, the linguistic analysis engine is able to vary the number of clusters for a group of patents. The resulting cluster-to-category mapping can be a many to one relationship since several clusters may be mapped to one category. For example, clusters 1, 8, 110 and 133 may all be mapped to a general category of "(A) Computer Heuristic Algorithms". Moreover, if a large number of clusters exist, then preferably the categories may be arranged in an hierarchy so that an user can select what level of detail is most fitting for the application at hand. For example, a general category of "(A) Computer Heuristic Algorithms" decompose into other categories of "(A.1) fuzzy logic", "(A.2) neural networks", etc. If needed, these categories may in turn decompose into still more detailed categories.

An inheritance principle exists between a parent and child category in that cluster numbers, factor values, and patent counts of a child category are automatically inherited for a parent category. For example, parent category B may have children categories B.1 and B.2. Child category B.1 has five patents with a particular factor breakdown and child category B.2 has seven patents with a particular factor breakdown. Parent category B would include the twelve patents with the cluster numbers and factor values of its children as well as any patents, cluster numbers, and factor values which parent category B itself has.

Since Patents have been assigned to each cluster, the titles and the United States Patent Office Classification titles for the Patents are used to categorize a cluster. Accordingly, an initial set of categories is developed based upon a brief review of the patents (usually the patent titles and the U.S. Patent Office Classification titles) and the cluster's key-words.

It should be understood that the present invention includes a patent being placed in one or more clusters depending upon the linguistic algorithm used. For example, an expert system patent used to detect failures may be placed in both of the following clusters: a cluster which is directed to expert systems in general; and a cluster which includes computer-related approaches for detecting failures (whether they be expert system approaches or another failure detection approach, such as through a threshold detection approach or through a neural network approach).

Below are two clusters and how they were assigned to categories:

| Cluster Num | Key Terms | Category |
|---|---|---|
| 1 | exper diagn compute store faul fail syst data address receive share retrieve | (A.1) Fuzzy Logic |
| 8 | neur diagn netw compute weig store faul fail syst data address nod share retrieve | (A.2) Neural Network |

A factor value is determined which indicates how well a patent fits within a cluster. Each Patent has a "cluster score" which indicates how strongly did a patent fit within the keywords of a cluster. For example, U.S. Pat. No. 5,122,976 has a cluster score of 16.3 for Cluster #1. U.S. Pat. No. 5,107,497 has a cluster score of 37.8 for Cluster #1. The higher cluster score indicates that U.S. Pat. No. 5,107,497 "fits" better with the keywords of Cluster #1 than the first Patent.

A factor value is utilized to indicate the fact that the second patent fits more closely with the keywords of Cluster #1 than the first patent. The following factor values are used:

| Cluster Score | Factor Value |
|---|---|
| Cluster Score ≥ 30 | 1 |
| 20 ≤ Cluster Score < 30 | .75 |
| 10 ≤ Cluster Score < 20 | .5 |
| 0 < Cluster Score < 10 | .25 |
| Cluster Score = 0 | 0 |

Each patent in each cluster is associated with the appropriate factor value based upon its cluster score.

If it is desired to determine how many patents an assignee has in each category, then the factor values are summed for each assignee in each category. The following table shows an example of a factor value breakdown of cluster number 1 for each Assignee for category A.1 (note that the other cluster numbers are omitted below for easier viewing of the table):

| Category Number | Category | Current Assignee | Factor | Claim Cluster Num | Cluster Score |
|---|---|---|---|---|---|
| A.1 | Fuzzy Logic | Assignee A | 0.5 | 1 | 15 |
| A.1 | Fuzzy Logic | Assignee B | 1 | 1 | 37 |
| A.1 | Fuzzy Logic | Assignee B | 1 | 1 | 30 |
| A.1 | Fuzzy Logic | Assignee B | 1 | 1 | 37 |

-continued

| Category Number | Category | Current Assignee | Factor | Claim Cluster Num | Cluster Score |
|---|---|---|---|---|---|
| A.1 | Fuzzy Logic | Assignee B | 0.75 | 1 | 28 |
| A.1 | Fuzzy Logic | Assignee B | 0.75 | 1 | 25 |
| A.1 | Fuzzy Logic | Assignee B | 1 | 1 | 33 |
| A.1 | Fuzzy Logic | Assignee B | 0.75 | 1 | 26 |
| A.1 | Fuzzy Logic | Assignee B | 1 | 1 | 32 |

The factor sum for Assignee A for Cluster #1 (which is assigned with other Clusters to Category A.1)=0.5. The factor sum for Assignee B for Cluster #1 (which is assigned with other Clusters to Category A.1) is 7.25.

FIG. 10 shows the other clusters for category A.1 and their factor sums. The factor sum for Assignee A for all clusters assigned to category A.1 "Fuzzy Logic" is 18.75. The factor sum for Assignee B for all clusters assigned to category A.1 "Fuzzy Logic" is 26.5.

The following table shows the sum of the factor values for each assignee 10 independent of cluster number:

| Category Number | Category | Assignee | Sum of Factor Values |
|---|---|---|---|
| A.1 | Fuzzy Logic | Assignee A | 18.75 |
| A.1 | Fuzzy Logic | Assignee B | 26.5 |

The present invention can graph the results which were obtained using the "Factor Approach". The Summed Factor Values for each Assignee and for each Category are graphed side-by-side. The 18.75 value indicates that Assignee A has approximately 19 Fuzzy Logic Patents while Assignee B has approximately 27 Fuzzy Logic Patents.

Also, the "difference" between the Assignees' Factor Values were determined and graphed. For example, the difference between the Assignees' Factor Values for the "Fuzzy Logic" Category was "18.75-26.5" or "-7.75". The -7.75 value indicates that Assignee B has approximately 8 more Fuzzy Logic patents than Assignee A. Through use of the present invention, the relative patent portfolio metric produces a more accurate assessment of how Assignee A stands with respect to other assignees. This may be due to any biases which enter into the algorithm on an absolute basis being cancelled when a relative comparison (or delta) is performed among the assignees' portfolios.

It is to be understood that the present invention is not limited to only examining two assignees, but includes comparing more than two assignees' patent portfolios. Moreover, it is to be understood that the present invention examines patents independent of assignee.

Bar graphs are produced that depict how many patents each Assignee has per category. Also, bar graphs are produced that depict the difference in the number of patents between two assignees for each category.

The present invention can also graph the results not using the "Factor Approach". The number of patents that each Assignee had within each Category can be graphed.

Moreover, the "difference" between the Assignees' number of patents for a particular category can be graphed.

The graphs can also show a time trend. The number of patents per category per assignee can be graphed on a yearly basis to indicate the growth status for the number of patents of a particular assignee.

The present invention can also depict the breadth of a claim by a claim breadth number. The claim breadth number for each independent claim is determined based upon the number of words that a claim contained. Since the preamble typically contains fewer restrictions upon a claim's breadth, the claim breadth number was reduced by the half the number of words within the preamble.

For example, Assignee A's U.S. Pat. No. 5,122,976 (entitled "Method and apparatus for remotely controlling sensor processing algorithms to expert sensor diagnoses") had a claim breadth number of "39: for its claim 1 and an adjusted claim breadth number of "37" (since the rounded up value of "three words divided by two" yielded a value of two):

| Patent No. | Claim Text | Unadjusted Breadth No. | Adjusted Breadth No. |
|---|---|---|---|
| 5,122,976 | 1. An apparatus, comprising: control means for sampling sensor data and performing sensor data processing; and diagnostic means for diagnosing a sensor malfunction using the sensor data, and said control means performing the sensor data processing responsive to the diagnosis. | 39 | 37 |
| 5,107,497 | 1. A method of forming a knowledge base in a computer for producing an expert system for diagnosing a predetermined arrangement of a system to determine if the system contains a fault, said system comprising a plurality of components having respective predetermined failure rates, the method comprising the steps of: (a) decomposing the system into groups of sequential and parallel subsystems, each of said subsystems comprising at least one of said components; (b) generating a tree structure of the groups of step (a) by attaching nodes to each parallel and sequential link between subsystems in the tree to provide a tree configuration of sets of components suspected of being faulty and possible choice measurement sets; (c) computing a lower bound cost of a sequence of tests for each of the parallel and sequential subsystems using a first rule that (1) if a node is a parallel node, then the lower bound cost for that node is computed by (i) sorting numerically and in a first predetermined order a first list P of the failure rates of the components of each subsystem, | | |

| Patent No. | Claim Text | Unadjusted Breadth No. | Adjusted Breadth No. |
|---|---|---|---|
| | (ii) sorting numerically and in a second predetermined order a second list L of test costs of the components of each subsystem, and (iii) for corresponding elements in lists P and L, computing a product of each of the corresponding elements, and (2) a second rule that if the node is a sequential node, then the lower bound cost of the sequence of test cases for that node is computed by (i) separately sorting numerically and in a predetermined order each of the failure rate and the test cost for each component of each subsystem in the first and second lists P and L, respectively, (ii) initializing a variable h to zero, (iii) selecting the lowest valued two numbers p.sub. 1 and p.sub.2 from the list P, (iv) computing a current value for a failure rate p by summing p.sub. 1 and p.sub.2 (v) selecting a first member c from list L, (vi) summing the current value of h with the product of the value of p.sub. 1 and p.sub.2 from step (iv), and placing such sum for the current value for h, (vii) inserting the current value of p in numerical order in list P, and (viii) repeating steps (iii) to (vii) until p = 1; and (d) generating a diagnostic knowledge base for generating a diagnostic fault testing sequence at an output of the computer. | | |

U.S. Pat. No. 5,107,497 on the other hand has a relatively high Adjusted Claim Breadth number, and if, for example, the purpose of the patent portfolio analysis is to determine which patents of the client are candidates for not maintaining through payment of maintenance fees, then this patent is a likely candidate due to its tendency to be too narrow to provide adequate protection for the client.

The preferred embodiment counts the words in a claim by counting the blank spaces (that is ASCII code 32) in the claim. This approach helps accelerate processing since the database may include hundreds of thousands of claims. The preferred approach also only examines the claim breadth of independent claims.

FIG. 11 is a computer screen display depicting claims that have been accorded a claim breadth number in accordance with the teachings of the present invention. For example, data entry 400 is a patent claim that has been accorded based on the teachings of the present invention a claim breadth of 21. Claims from other patents with small claim breadth numbers are included but may be from different clusters. Through use of pull down menu 402, a user can select to see patent claims in a particular cluster. For example, the user can select to see E-Commerce patents by selecting that option within putt down menu 402.

FIG. 12 shows the results of patents which appear in the E-Commerce cluster. In this non-limiting example, clusters were formed by grouping one or more United States patent and classification subclasses that relate to Internet E-Commerce patents.

For example, patents classified under United States patent classification "705/26" and subclass "705/27" were placed under the cluster entitled Internet E-Commerce Patents.

If a user wished to see additional patent information related to a patent appearing on screen 412, user selects the patent by depressing the button 412.

Figure 13:
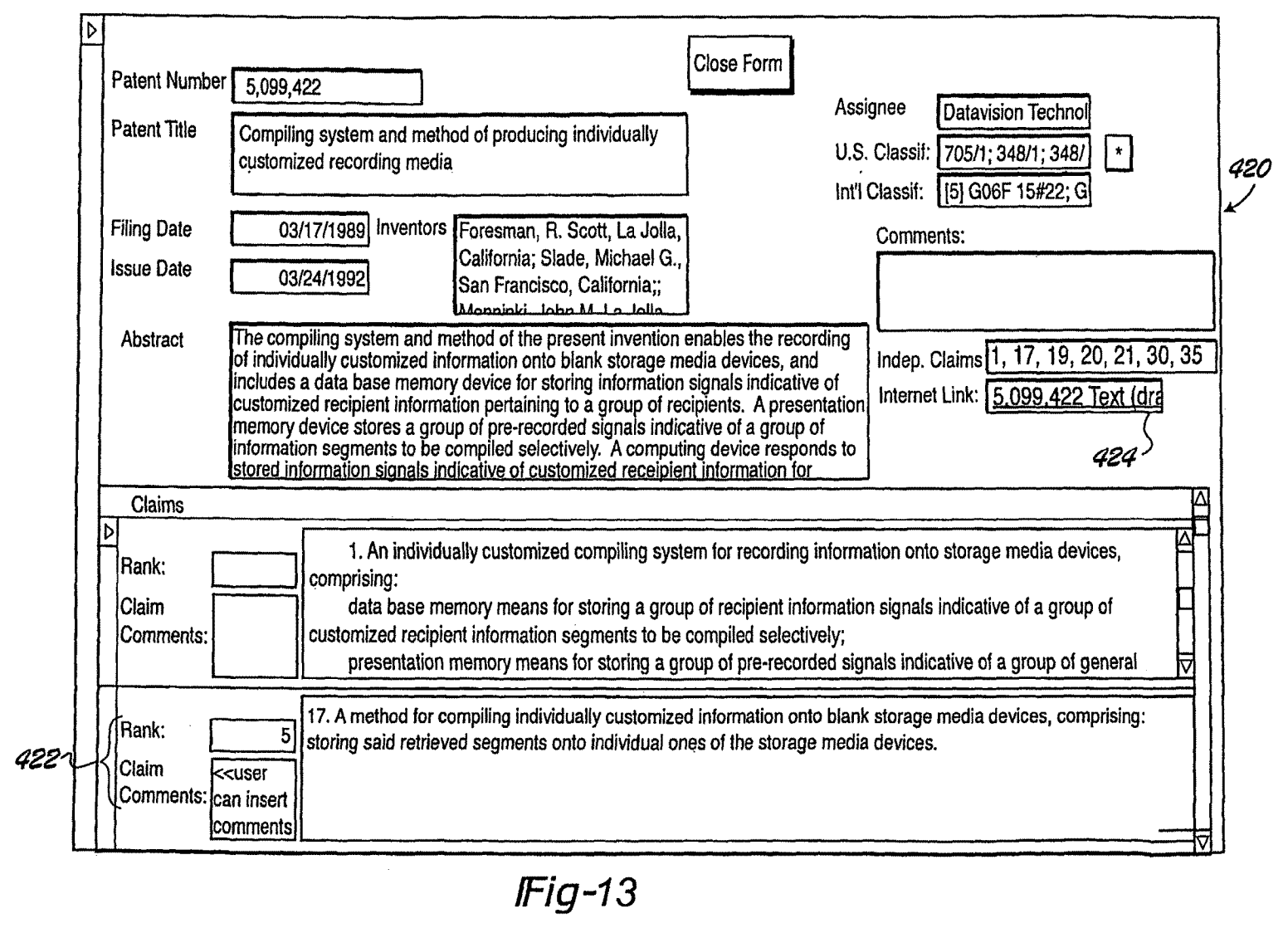

FIG. 13 depicts the computer screen 420 that shows the greater detail for a selected patent. Screen 420 also includes fields 422 that allow a user to place a claim relevance rank number as well as comments that can be used to generate a report of claims of interest. In the preferred embodiment, a claim rank from 0 to 5 is used where 5 represents the group of patents of greatest concerns and 0 of least concern. If the user wished to see greater detail of this particular patents, the user selects the Internet link via field 424 in order to see the full text or drawings of the patent. To perform this functionality, the present invention dynamically constructs in the database an Internet link to a patent database that is located remotely. The present invention preferably does not contain the full text of the patents nor patent drawings, but supplies an Internet link to the United States Patent database. The present invention uses the each patent's patent number to construct the URL (uniform resource locator) link using the following non-limiting exemplary code:

```
urlstr$ = "http://164.195.100.11/netacgi/nph-
    Parser?Sect1=PTO2&Sect2=HITOFF&p=1&u=/netahtml/search-
    bool.html&r=1&f=G&l=50&co1=AND&d=pall&s1=" + patno$ +
    ".WKU.&OS=PN/" + patno$ + "&RS=PN/" + patno$
```

Figure 14:
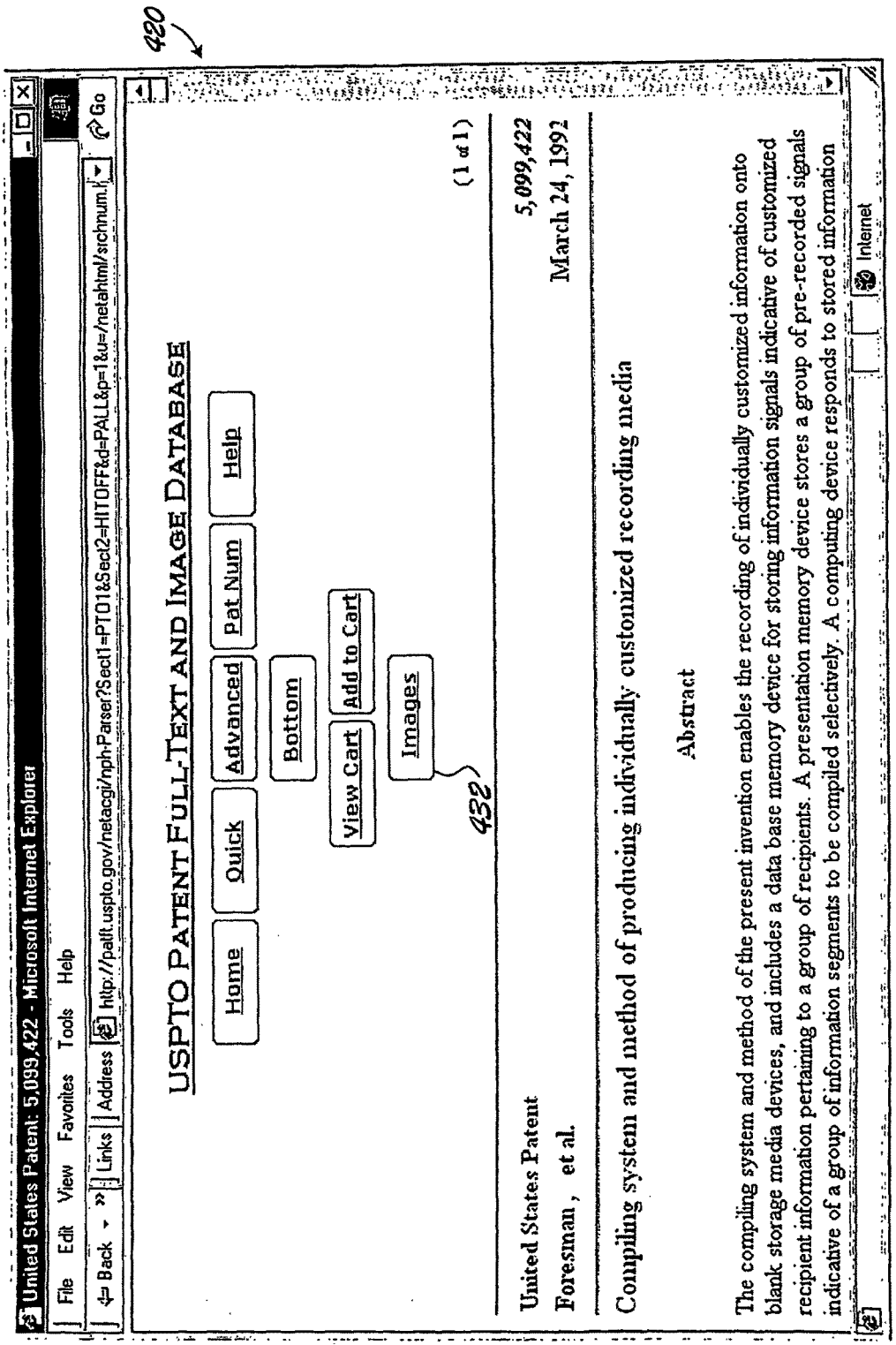
FIG. 14 is a screen display depicting a patent as viewed on the United States Patent and Trademark Office Internet website.
Figure 15:
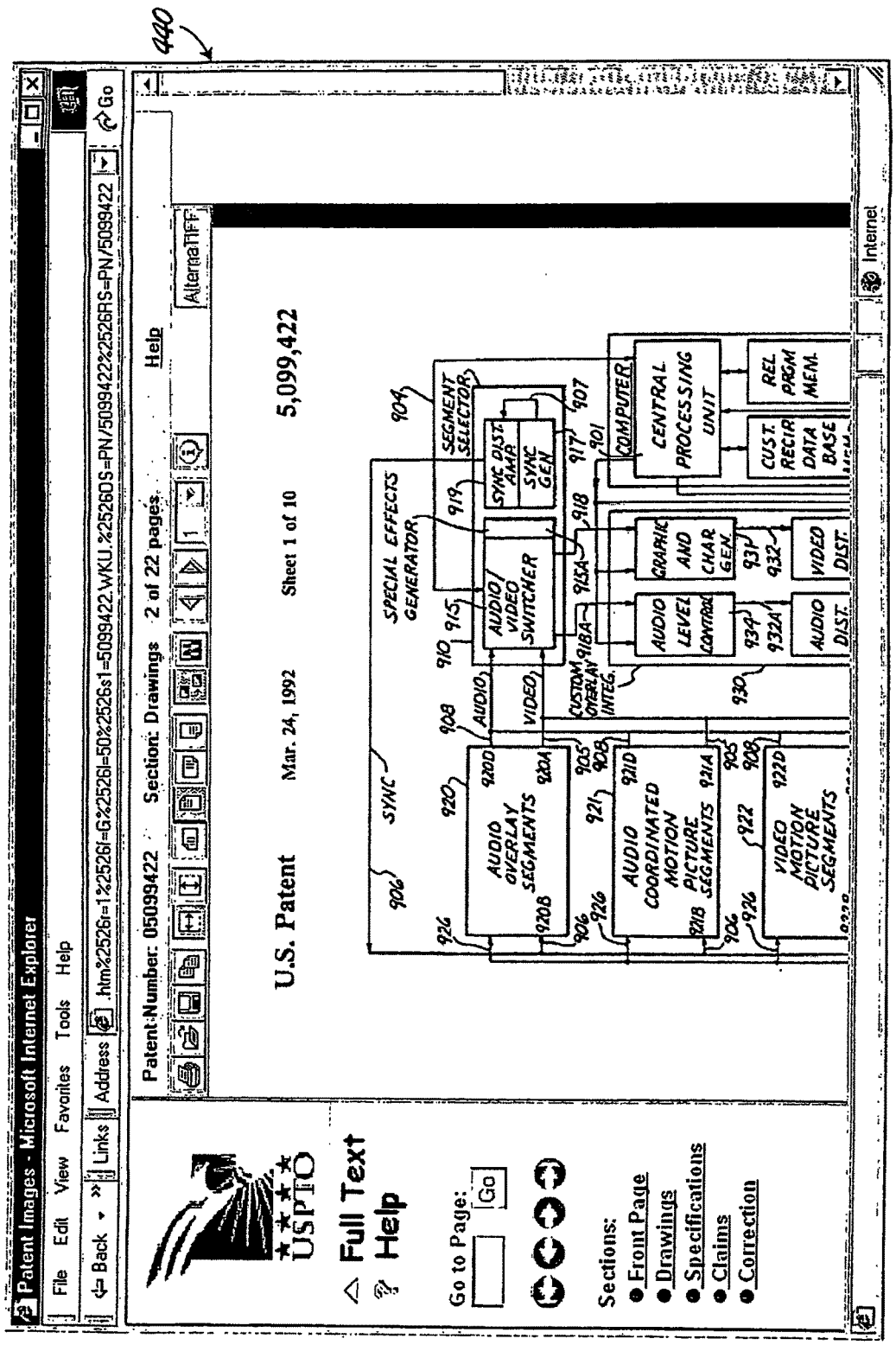
FIG. 15 is a screen display depicting a drawing of a patent as appearing on the United States Patent and Trademark Internet website.

FIG. 14 depicts the results of the user selecting the Internet link field, and the screen displays the full text of the patent as contained on the United States Patent and Trademark Office Internet Web Site. Moreover, by selecting button 432, the user can see all of the figures of the patent as shown by screen 440 on FIG. 15.

FIG. 16 shows an exemplary report 450 that a user can generate for claims that are of issue.

FIG. 17 is a computer screen display showing a descending order of claim breadth. For example, data entry 460 depicts a claim of claim breadth 1210. A user can enter into data entry field 462 an Assignee's name in order to locate those claims of relatively large claim breadth that belong to the Assignee. In this manner, an Assignee has one method for determining which claims maintenance should not be paid.

The full text of this claim is the following:

10. A method of operating a computer for evaluating whether an article has a structure which facilitates work to be performed thereon, comprising:
   registering data, in said computer and processing to data to evaluate easiness of work to be performed on an article under evaluation,
   said registering delta in said computer includes the steps of:
   (a) inputting into an input unit and registering in a basic storage part of a storage unit (i) a plurality of states corresponding to parts constituting said article, said states being classified into basic elements, respectively, (ii) at least one value of standard work cost and required time and indexes associated with performing work on a part having said basic elements in a standard state, and (iii) corresponding identification symbols of said basic elements,
   (b) inputting into the input unit and registering in a supplementary element storage part of said storage unit (i) a plurality of factors other than said basic elements which exert influence to the work cost and the required time for each of said basic elements and the indexes thereof, said factors being classified into supplementary elements, respectively, (ii) values of standard work costs and standard required times associated with the work to be performed on said parts in each of said states and indexes thereof, respectively, and (iii) corresponding identification symbols of said supplementary elements, respectively,
   (c) selecting as standard elements from the registered 10 basic elements, those basic elements which represent predetermined states to serve as standards, while supplementary standards representing predetermined states serving as standards, are inputted for said registered supplementary elements, respectively, both of said standard elements and said supplementary standards being registered in a standard storage part of said storage unit,
   (d) determining basic elimination scores indicating degrees of difficulty of the works to be performed for said basic elements, respectively, based on at least one of the work costs, the required times and the indexes thereof for said basic elements, respectively, with reference to at least one of the work costs, the required times and the indexes thereof for said standard elements, and subsequently registering the basic elimination scores in said basic element storage part, and
   (e) determining supplementary coefficients representing degrees of difficulty of the works for the states of said supplementary elements based on at least one of the work costs, the required times and the indexes thereof for the states of said supplementary elements with reference to at least one of the work costs, the required times and the indexes thereof for supplementary standards of said supplementary elements, respectively, and subsequently registering the supplementary coefficients in said supplementary element storage part,
   said data processing to evaluate easiness of work to be performed on the article under evaluation includes the steps of:
   (f) inputting through said input unit, the identification symbols representing the basic elements and the supplementary elements for each of the parts constituting said article under evaluation,
   real values of the work costs, real values of the required times or real values of indexes thereof for an existing article and existing parts bearing similarities to said article and said parts and identification symbols representing basic elements and supplementary elements of said existing parts,
   (g) reading basic elimination scores and supplementary coefficients from said basic element storage part and said supplementary element storage part on the basis of the inputted identification symbols representing the basic elements and the supplementary elements of each of said parts, and determining part elimination scores based on said basic elimination scores and said supplementary coefficients as read out, in accordance with a first index function which produces an increasing value when at least one of the work cost, the required time and the indexes thereof for each of said parts, increases as compared with at least one of work cost, required time and index thereof for a part standard corresponding to said part,
   said part standard having said standard elements, and all of the supplementary elements other than the supplementary element representing size being the supplementary standards and each having a size of a predetermined ratio,
   (h) arithmetically determining a part-based work easiness evaluation score indicating the degree of difficulty of work for each of the parts, by decreasing or increasing the part elimination score from a predetermined standard value,
   (i) determining an article elimination score based on said part-based work easiness evaluation scores, in accordance with a second index function which produces an increasing value when at least one of the work cost, the required time and the indexes thereof for said article under evaluation, as determined by summing at least ones of the work costs, the required times and the indexes thereof, increases as compared with at least one of the work cost, the required time and the indexes thereof for an article standard,
   said article standard being a standard of the article under evaluation which is assumed to be constituted by a combination of said part standards,
   (j) generating an article-based work easiness evaluation score indicating the degree of difficulty of the work for the article under evaluation, by decreasing or increasing the value of the article elimination score from a predetermined standard value,
   (k) reading said basic elimination scores and said supplementary coefficients from said basic element storage part and said supplementary element storage part based on the inputted identification symbols representing the basic elements and the supplementary elements of each of said existing parts, and
   determining part elimination scores for said existing parts based on said basic elimination scores and said supplementary coefficients read out in accordance with said first index function,
   determining (i) a part-based work easiness evaluation score for each of said existing parts depending on increase or decrease of said part elimination score, from said predetermined standard value, and (ii) an article-based work easiness evaluation score of said existing article based on said part-based work easiness evaluation scores, in accordance with said second index function, (l) comparing the part-based work easiness evaluation scores of the parts of the article under evaluation with the partbased work easiness evaluation scores of said existing parts on the basis of the real values of the work costs, the real values of the required times or real values of the indexes thereof for the existing parts, to determine estimated values of the work costs, the required times or the indexes thereof for the parts under evaluation, (m) comparing the article-based work easiness evaluation score of the article under evaluation with the article-based work easiness evaluation score of said existing article, on the basis of the real values of the work costs, the real values of the required times or real values of the indexes thereof for the existing article, to determine estimated values of the work costs, the required times or the indexes thereof for the article under evaluation, and (n) outputting the estimated values of said article-based work easiness evaluation score, said part-based work easiness evaluation scores and the work costs as well as the required times or indexes thereof for said article under evaluation and parts.

FIG. 18 depicts an exemplary computer screen for showing time trend analysis based upon year, assignee, and category. For example, a user can select a particular assignee in data entry field 472 in order to see time trend analysis related to that assignee. Data results are shown in FIG. 19 for a particular assignee. If the user desires, the present invention also allows the user to show time trend analysis related to patents in a particular category/cluster. For example, the user can select to see time trend analysis related to patent filings for an Assignee filing in the point of sale terminal technological area. By using pull down box 482, the user can select which categories/clusters the user wishes to view.

Figure 20:
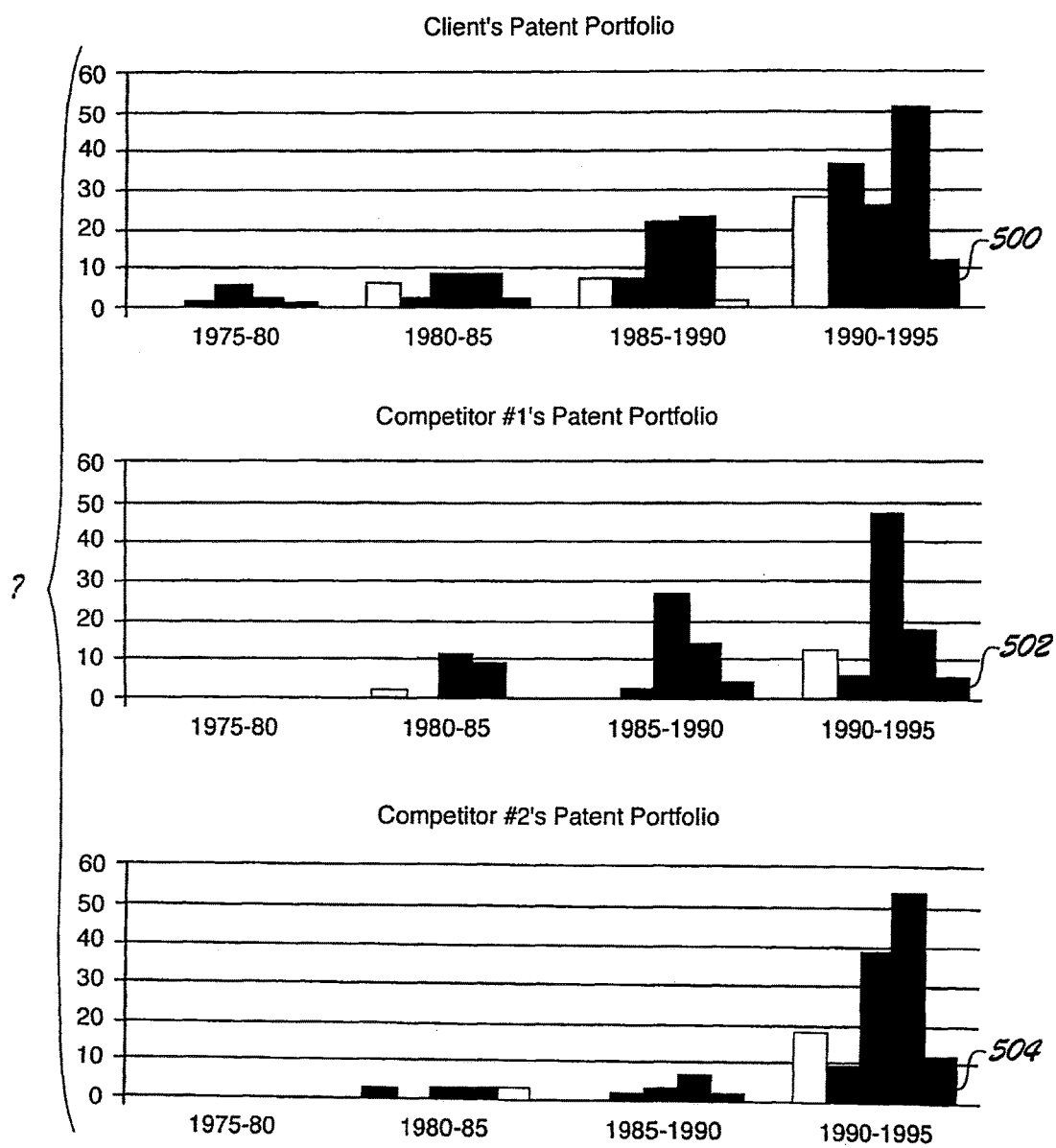
FIG. 20 is a screen display depicting claim breadth analysis showing claims with a relatively large claim breadth numbers.

Through use of the results of FIG. 19, the present invention can generate bar charts that compare time trends among different companies. For example, FIG. 20 depicts a comparison grouped in five year intervals for different categories of companies' patent portfolios. For example, bar 500 represents the number of patents one company has filed in the year interval of 1990 through 1995 in a particular technological cluster area while bars 502 and 504 represent the filing information for other companies in the same category for the same time interval.

FIG. 21 depicts a classification analysis tool for showing how an Assignee has filed in which particular patent classifications. In data entry field 520, a user can select a particular assignee to determine for example what the assignee has filed in U.S. Patent Class 705. FIG. 22 depicts the results of how a particular Assignee has filed in which subclasses of 705.

The present invention also includes a patent financial portfolio analysis tool. In the preferred embodiment, the present invention determines how many patents were filed in which particular years and when did they issue. A services and cost model is then used to determine the cost associated with the filings in each of the years. In order to do patent cost projections, for example in the years 2000 through 2005, cost projections for filing and for issued patents are determined in the following way. The number of patents filed in the preceding five years are examined via linear regression to determine whether the number of patent filings have generally increased. If so, the present invention places the projected number of U.S. filings to grow in that particular manner. However, in an alternate embodiment, an average of the preceding five years is used to establish the projected number. For example, the average from 1993 through 1997 is thirteen as shown by cell 552. Accordingly, the cell values for the number of United States filed applications is set at thirteen. The patent financial model takes as an assumption that a filed patent will issue within two and one half years. Accordingly, cells as shown by reference numeral 556 are determined based upon what patents were filed in the two and one half years preceding it.

Based upon the number of United States filed patent applications and the number of United States issued patents for a particular Assignee, the attorney service fees associated with the particular year are calculated as shown by column 558. In a similar fashion, column 560 shows the costs charged by the United States Patent Office in handling a filed or issued patent application. Column 562 shows a total of columns 558 and 560.

FIG. 24 depicts a similar example for foreign filing in a nonlimiting exemplary country, such as Germany. Additionally, not only are the U.S. attorney's fees for handling filing and issuing of patents in Germany shown by Column 582, but also the fees charged by German foreign agents are shown in Column 584.

Figure 25:
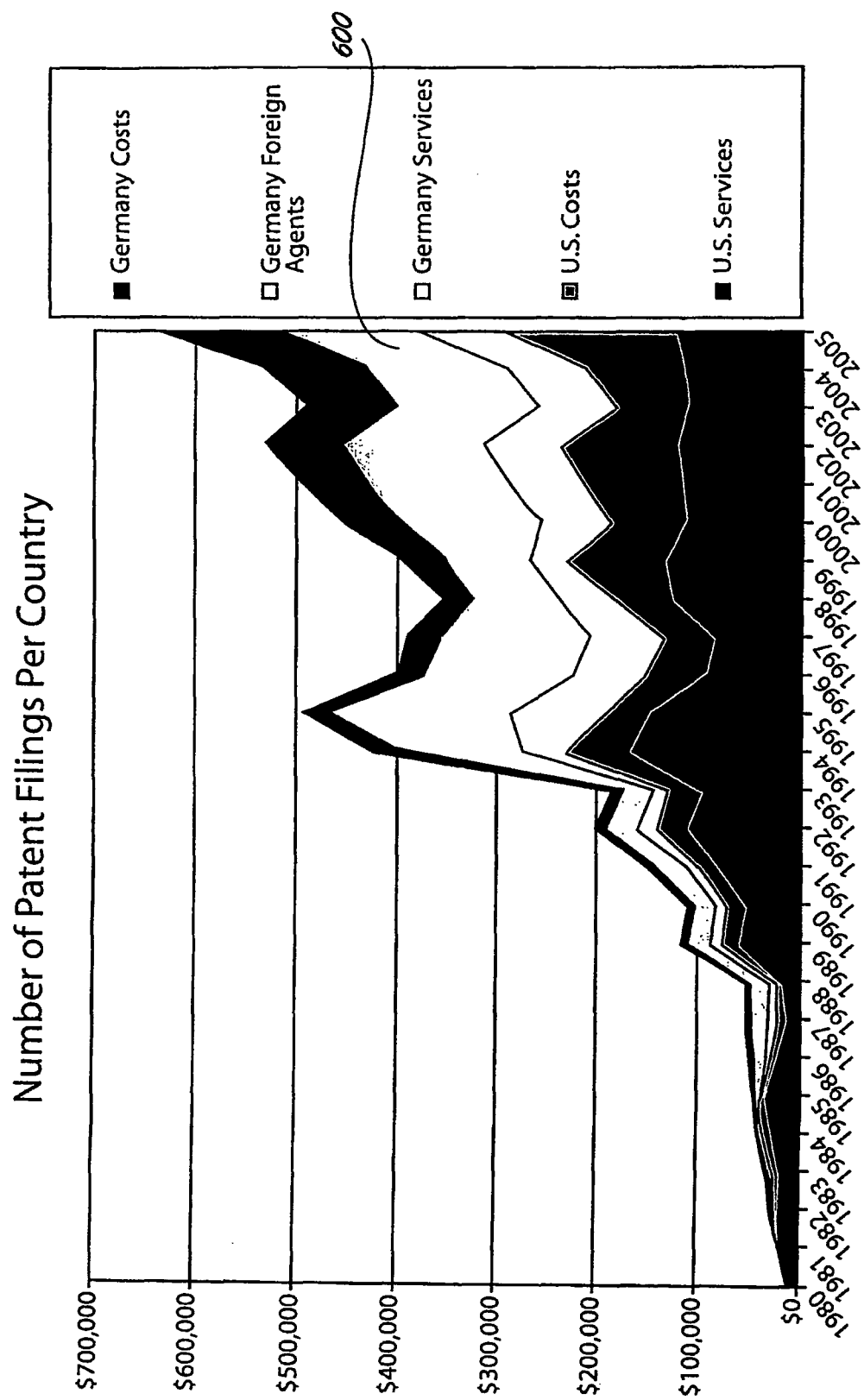
FIGS. 25 and 26 are X-Y graphs depicting cost associated with different patent filing profiles.
Figure 26:
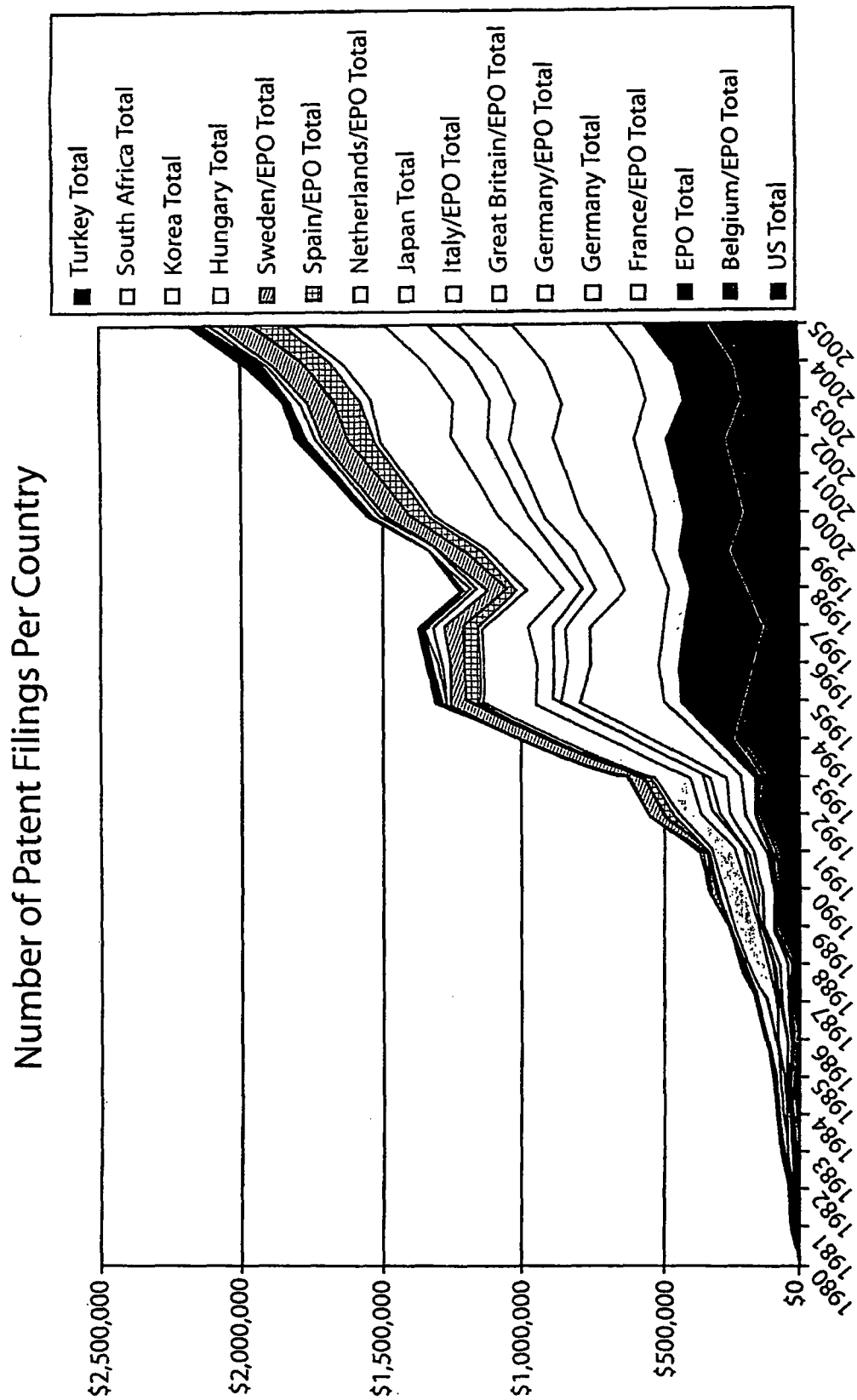

FIG. 25 depicts the financial cost associated with filing and issuing of patents according to the patent filing and issuing profile of FIGS. 23 and 24. Such a bar chart of FIG. 25 is extremely helpful for an assignee in determining which segments of the patent process are consuming the most amount of the assignee's financial resources. For example, graph area 600 shows the Germany foreign agents consumed relatively little resources in the years 1980 through 1994, but consumed an increasingly growing amount of financial resources in the succeeding years, including the projected years of 2000 through 2005. FIG. 26 shows that the present invention is capable of analyzing a large number of countries' financial costs.

FIG. 27 depicts a configuration input data table used by the present invention in order to determine the financial costs associated with filing and issuing of patent applications. For example, the filing of a United States patent application is associated with a cost of $5,000.00 as charged by a typical attorney as shown by reference numeral 620. A typical U.S. patent filing fee is a charge $1,000.00 as shown by reference numeral 622. Accordingly, every filed patent shown in FIGS. 23 and 24 will be associated with U.S. services costs of $5,000.00 and a U.S. filing cost of $1,000.00.

With reference back to FIG. 27, patents that are filed in the years one through two years after filing are associated with a cost of $3,000.00 for handling the first and second office actions as shown by reference numeral 624. Similarly, issue fee data is calculated for issued patents by the column depicted by reference numeral 626.

FIG. 28 depicts a similar input data configuration table for filing and issuing expenses associated with filing in Germany.

FIG. 29 depicts a computer screen wherein the present invention has calculated various claim breadth statistics associated with various assignees. In one embodiment of the present invention, the statistics can be gathered based on the entire patent portfolio of an assignee or upon a cluster of patents owned by the assignee. In another embodiment, claim breadth statistics can be calculated for all patents in a particular cluster independent of assignee. In this manner, statistics of an assignee in a particular cluster can be compared against claim breadth statistics for the cluster in general.

FIG. 29 depicts a comparison of assignees in a particular cluster. For example, assignee #5 appears to have the broadest claims of all the assignees surveyed as shown by reference numeral 640. A standard deviation as shown by reference numeral 642 depicts the spread of the claim breadth numbers associated with a particular Assignee. Column 644 shows the number of claims considered in the statistical calculation. Columns 646 and 648 depict respectively the minimum and maximum of the claim breadth metric for each assignee. These statistics are very helpful to an assignee assessing whether an assignee is potentially getting "good" claim coverage versus what other companies are receiving in a cluster or receiving in general. While the invention has been described in its presently preferred embodiments, it will be understood that the invention is capable of certain modification without departing from the spirit of the invention.

It is claimed:

1. A computer-implemented patent portfolio analysis method comprising:
   providing user-prescribed categories which were specified by a user;
   retrieving a corpus of patent information from a database, wherein the patent information is information from multiple patent documents;
   analyzing said patent information to generate a category model corresponding to at least one of said user-prescribed categories; and
   applying said model against said patent information to select from said patent information a subset that fits said model and storing said subset in association with a label corresponding to said at least one of said user-prescribed categories in a computer-readable dataset,
   wherein said patent information includes textual information selected from the group consisting of patent specification, abstract, title and combinations thereof to be analyzed and wherein said analyzing step includes:
   processing the textual information to strip out delimiters that designate different fields within the textual information and thereby produce processed textual information;
   defining an eigenspace representing a training population of training textual information;
   representing at least a portion of said training textual information in said eigenspace and associating a predefined category with each training textual information in said eigenspace; and
   projecting the processed textual information to be analyzed into said eigenspace and associating with said projected processed textual information the predefined category of the training textual information to which said projected textual information is closest within the eigenspace.

2. The method of claim 1 wherein said patent information includes patent classification information and wherein said analyzing step is performed by defining a plurality of categories and mapping classification information onto said categories.

3. The method of claim 1 wherein said patent information includes using both patent classification information and linguistic analysis results to define said category model.

4. The method of claim 3 wherein the category model is indicative of technical areas of the patent documents.

5. The method of claim 1 further comprising: retrieving text of claims from the database, wherein the text of claims are from the plurality of patent documents; analyzing the text of the claims in order to generate claim breadth metrics for the claims, wherein a claim breadth metric is indicative of claim breadth of a claim, wherein the claim breadth metrics are used to analyze the claims.

6. The method of claim 1 wherein a label associated with the category model is predetermined.

7. The method of claim 1 wherein a label associated with the category model is dynamically determined.

* * * * *